(12) United States Patent
Garg et al.

(10) Patent No.: US 11,369,924 B2
(45) Date of Patent: Jun. 28, 2022

(54) MEMBRANE SEPARATION SYSTEM AND OPERATION METHOD FOR MEMBRANE SEPARATION SYSTEM

(71) Applicant: Toray Industries, Inc., Tokyo (JP)

(72) Inventors: Akshay Garg, Otsu (JP); Yoshiki Okamoto, Otsu (JP); Shinichiro Yoshidomi, Otsu (JP); Shigehisa Hanada, Otsu (JP); Norihiro Takeuchi, Otsu (JP)

(73) Assignee: Toray Industries, Inc., Tokyo (JP)

( * ) Notice: Subject to any disclaimer, the term of this patent is extended or adjusted under 35 U.S.C. 154(b) by 179 days.

(21) Appl. No.: 16/964,245

(22) PCT Filed: Dec. 25, 2018

(86) PCT No.: PCT/JP2018/047437
§ 371 (c)(1),
(2) Date: Jul. 23, 2020

(87) PCT Pub. No.: WO2019/146342
PCT Pub. Date: Aug. 1, 2019

(65) Prior Publication Data
US 2021/0039048 A1    Feb. 11, 2021

(30) Foreign Application Priority Data

Jan. 25, 2018  (JP) .............................. JP2018-010253
Feb. 26, 2018  (JP) .............................. JP2018-031533

(51) Int. Cl.
*B01D 61/58* (2006.01)
*B01D 63/12* (2006.01)
*C02F 1/44* (2006.01)

(52) U.S. Cl.
CPC ............. *B01D 63/12* (2013.01); *B01D 61/58* (2013.01); *C02F 1/44* (2013.01);
(Continued)

(58) Field of Classification Search
CPC ........ B01D 63/10; B01D 63/12; B01D 61/58; B01D 65/08; B01D 2317/08;
(Continued)

(56) References Cited

U.S. PATENT DOCUMENTS 3,933,646 A * 1/1976 Kanamaru ........... B01D 63/106
                                                      210/321.83
6,402,958 B1   6/2002 Andou et al.
(Continued)

FOREIGN PATENT DOCUMENTS

CN    103282105 A    9/2013
EP      0188224 A2    7/1986
(Continued)

OTHER PUBLICATIONS

Chinese Office Action for Chinese Application No. 201880087696.2 dated Oct. 29, 2021 with partial translation, 8 pages.
(Continued)

*Primary Examiner* — Pranav N Patel
(74) *Attorney, Agent, or Firm* — RatnerPrestia

(57) ABSTRACT

The present invention relates to a membrane separation system including a plurality of separation membrane elements connected to one another, each of the separation membrane elements including a plurality of separation membrane pairs, each separation membrane pair including separation membranes each having a feed-side surface and a permeate-side surface and disposed such that the feed-side surfaces face each other, in which the plurality of separation membrane elements include a first separation membrane element and a second separation membrane element, and at least one first separation membrane element serves as a stage preceding the second separation membrane element.

9 Claims, 9 Drawing Sheets

(52) U.S. Cl.
CPC .... *B01D 2317/022* (2013.01); *B01D 2317/04* (2013.01); *C02F 2301/08* (2013.01)

(58) Field of Classification Search
CPC .......... B01D 2317/02; B01D 2317/022; B01D 2317/025; B01D 2319/06; B01D 2319/02; B01D 2319/022; B01D 2319/025; B01D 2103/08; C02F 1/44; C02F 2301/08
See application file for complete search history.

(56) References Cited

U.S. PATENT DOCUMENTS

| | | | |
|---|---|---|---|
| 6,432,310 | B1 | 8/2002 | Andou et al. |
| 6,533,937 | B1 | 3/2003 | Adachi et al. |
| 2013/0334128 | A1 | 12/2013 | Takagi et al. |
| 2015/0001151 | A1 | 1/2015 | Nakano et al. |
| 2015/0068971 | A1 | 3/2015 | Koiwa et al. |
| 2015/0144560 | A1* | 5/2015 | Taniguchi ............ B01D 63/106 210/321.74 |
| 2017/0173534 | A1* | 6/2017 | Miyakawa ............ B01D 61/08 |

FOREIGN PATENT DOCUMENTS

| | | |
|---|---|---|
| EP | 1022050 A3 | 3/2003 |
| EP | 2857359 A1 | 4/2015 |
| JP | 6116104 A | 7/1986 |
| JP | 2000271454 A | 10/2000 |
| JP | 2001137672 A | 5/2001 |
| JP | 3963304 B2 | 8/2007 |
| JP | 2011189302 A | 9/2011 |
| JP | 2012130840 A | 7/2012 |
| WO | 2012086479 A1 | 6/2012 |

OTHER PUBLICATIONS

Indian Examination Report for Indian Application No. 202047030912, dated June 24, 2021, with translation, 6 pages.
International Search Report and Written Opinion for International Application No. PCT/JP2018/047437, dated Feb. 12, 2019, 5 pages.

* cited by examiner

MEMBRANE SEPARATION SYSTEM AND OPERATION METHOD FOR MEMBRANE SEPARATION SYSTEM

CROSS REFERENCE TO RELATED APPLICATIONS

This is the U.S. National Phase application of PCT/JP2018/047437, filed Dec. 25, 2018, which claims priority to Japanese Patent Application No. 2018-010253, filed Jan. 25, 2018 and Japanese Patent Application No. 2018-031533, filed Feb. 26, 2018, the disclosures of these applications being incorporated herein by reference in their entireties for all purposes.

FIELD OF THE INVENTION

The present invention relates to a membrane separation system, and an operation method for the membrane separation system.

BACKGROUND OF THE INVENTION

In recent years, in technique for eliminating ionic substances contained in seawater, brackish water or the like, a separation method using separation membrane elements has been used more widely as a process for saving energy and saving resources. Separation membranes for use in the separation method using separation membrane elements are classified into microfiltration membranes, ultrafiltration membranes, nanofiltration membranes, reverse osmosis membranes, and forward osmosis membranes. Those separation membranes are, for example, used for producing drinking water from seawater, brackish water, water containing deleterious materials, or the like, for producing industrial ultrapure water, for treating waste water, and for recovering valuables. The separation membranes are used properly in accordance with intended separation components and intended separation performance.

There are various forms as the separation membrane elements. However, all the separation membrane elements share a common feature, in which a feed fluid is supplied to one surface of a separation membrane and a permeated fluid is obtained from the other surface of the separation membrane. Each separation membrane element has a large number of bundled separation membranes. Thus, the separation membrane element is formed to increase the membrane area per a separation membrane element, that is, to increase the amount of permeated fluid obtained per a separation membrane element. Various forms such as a spiral type, a hollow fiber type, a plate and frame type, a rotary flat membrane type, or a flat membrane integration type have been proposed as the separation membrane elements in accordance with applications or purposes.

For example, spiral type separation membrane elements are used widely for reverse osmosis filtration. Such a spiral type separation membrane element has a perforated-water collection tube and a laminate wound around the perforated-water collection tube. The laminate is formed by laminating feed-side channel materials, separation membranes and permeate-side channel materials. The feed-side channel materials supply a feed fluid (that is, raw water) to surfaces of the separation membranes, the separation membranes separate components contained in the feed fluid, and the permeate-side channel materials introduce a permeate-side fluid permeated through the separation membranes to the perforated-water collection tube. The spiral type separation membrane element is used favorably because it can apply pressure to the feed fluid to increase the amount of permeated fluid obtained therefrom.

In recent years, treatment applications using reverse osmosis membranes have been expanded to applications as reverse osmosis water purifiers for separating and eliminating impurities or microorganisms included in tap water, as well as applications for desalination of seawater or desalination of brackish water. A membrane separation system with a high recovery ratio is required with increase in request to reduce the desalination cost or reduce the environmental load.

For example, in a membrane separation system disclosed in Patent Literature 1, reverse osmosis membrane modules are connected in two stages, water concentrated thus is further supplied to a nanofiltration membrane module, and water permeated through the nanofiltration membrane module is circulated back to a raw water line to thereby increase the recovery ratio. In addition, in a membrane separation system disclosed in Patent Literature 2, a difference in flow rate on membrane surface is provided between a preceding stage and a subsequent stage in reverse osmosis membrane modules disposed in many stages so as to increase the recovery ratio and save the energy.

PATENT LITERATURE

Patent Literature 1: JP-A-2011-189302
Patent Literature 2: Japanese Patent No.3963304

SUMMARY OF THE INVENTION

According to the technique of Patent Literature 1 or 2, the recovery ratio of the membrane separation system can be indeed increased, but particularly the concentration of the raw water supplied to the separation membrane module in the subsequent stage is so high that the water quality of permeate deteriorates while inorganic scales are deposited. Thus, it is difficult to maintain stable performance for a long time.

It is therefore an object of the present invention to provide a membrane separation system and an operation method for the membrane separation system, in which high separation performance and long-term performance stability can be provided even in high recovery ratio operation.

In order to attain the foregoing object, a membrane separation system of an embodiment of the present invention includes a plurality of separation membrane elements connected to one another, each of the separation membrane elements including: a perforated-water collection tube; a plurality of separation membrane pairs, each separation membrane pair including separation membranes each having a feed-side surface and a permeate-side surface and disposed such that the feed-side surfaces face each other; a feed-side channel material provided between the feed-side surfaces of the separation membrane pairs; and a permeate-side channel material provided between the permeate-side surfaces of the separation membrane pairs, in which the separation membrane pairs, the feed-side channel material and the permeate-side channel material are spirally wound around the perforated-water collection tube, the plurality of separation membrane elements include a first separation membrane element and a second separation membrane element, the separation membrane pair included in the first separation membrane element includes a raw water feed portion and a concentrate discharge portion respectively in opposite end portions in a longitudinal direction of the perforated-water collection tube, the separation membrane pair included in the second separation membrane element includes a raw water feed portion or a concentrate discharge portion in an end portion in a direction perpendicular to the longitudinal direction of the perforated-water collection tube, and at least one first separation membrane element serves as a stage preceding the second separation membrane element.

In addition, an operation method for a membrane separation system of an embodiment of the present invention is an operation method for a membrane separation system including an element unit A including a plurality of separation membrane elements connected to one another in series, each of the separation membrane elements including: a perforated-water collection tube; a plurality of separation membrane pairs, each separation membrane pair including separation membranes each having a feed-side surface and a permeate-side surface and disposed such that the feed-side surfaces face each other; a feed-side channel material provided between the feed-side surfaces of the separation membrane pairs; and a permeate-side channel material provided between the permeate-side surfaces of the separation membrane pairs, in which the separation membrane pairs, the feed-side channel material and the permeate-side channel material are spirally wound around the perforated-water collection tube, the element unit A includes a first separation membrane element and a second separation membrane element, the separation membrane pair included in the first separation membrane element includes a raw water feed portion and a concentrate discharge portion respectively in opposite end portions in a longitudinal direction of the perforated-water collection tube, the separation membrane pair included in the second separation membrane element includes a raw water feed portion or a concentrate discharge portion in an end portion in a direction perpendicular to the longitudinal direction of the perforated-water collection tube, and at least one first separation membrane element serves as a stage preceding the second separation membrane element, and in which a separation in a part of the separation membrane elements constituting the membrane separation system is suspended in accordance with a required amount of permeate in the membrane separation system.

An operation method for a membrane separation system of another embodiment of the present invention is an operation method for a membrane separation system including a separation membrane element unit including a plurality of separation membrane elements E1 disposed therein, each of the separation membrane elements E1 including: a perforated-water collection tube; a plurality of separation membrane pairs, each separation membrane pair including separation membranes each having a feed-side surface and a permeate-side surface and disposed such that the feed-side surfaces face each other; a feed-side channel material provided between the feed-side surfaces of the separation membrane pairs; and a permeate-side channel material provided between the permeate-side surfaces of the separation membrane pairs, in which the separation membrane pairs, the feed-side channel material and the permeate-side channel material are spirally wound around the perforated-water collection tube, each of the plurality of separation membrane elements E1 is capable of being changed over between a state S1 in which a feed water is separated into a permeate and a concentrate and discharged and a state S2 in which an all of the feed water is discharged as the concentrate, the plurality of the separation membrane elements E1 include a first separation membrane element and a second separation membrane element, the separation membrane pair included in the first separation membrane element includes a raw water feed portion and a concentrate discharge portion respectively in opposite end portions in a longitudinal direction of the perforated-water collection tube, the separation membrane pair included in the second separation membrane element includes a raw water feed portion or a concentrate discharge portion in an end portion in a direction perpendicular to the longitudinal direction of the perforated-water collection tube, at least one first separation membrane element serves as a stage preceding the second separation membrane element, and the following relation is satisfied:

$N1 < N2 < N3$, in which N1 designates the number of the separation membrane elements E1 in the state S2 when a concentration of a substance X in the raw water supplied to the separation membrane element unit is not smaller than a threshold A, N2 designates the number of the separation membrane elements in the state S2 when the concentration of the substance X in the raw water is smaller than the threshold A, and N3 designates the total number of the separation membrane elements.

In a membrane separation system and an operation method for the membrane separation system of the present invention, influence of reduction in separation performance and life length caused by concentration of a separated component in raw water can be reduced even in operation performed at a high recovery ratio, and operation can be performed stably for a long time while keeping high desalination rate and high separation performance.

DETAILED DESCRIPTION OF EMBODIMENTS OF THE INVENTION

Next, an embodiment of a membrane separation system of the present invention will be described in detail.

(1) Separation Membrane
<Summary>

Figure 1:
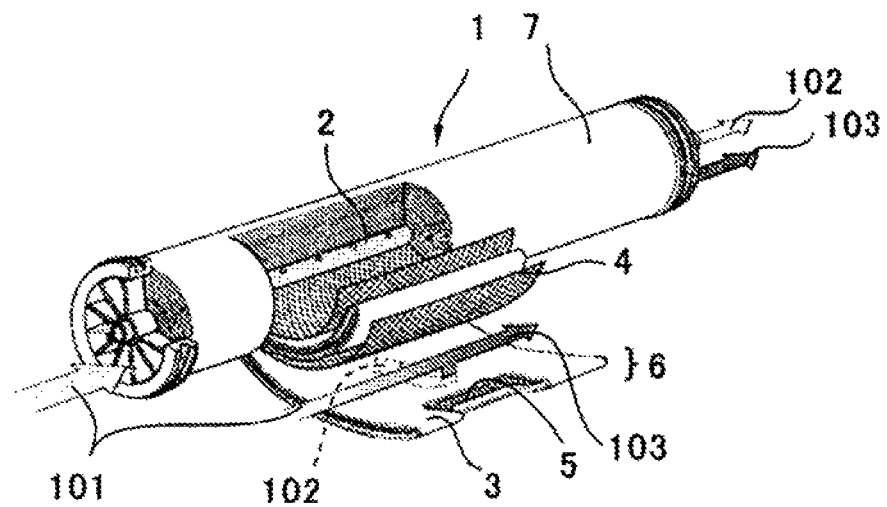
FIG. 1 is an exploded perspective view of a typical separation membrane element.
Figure 2:
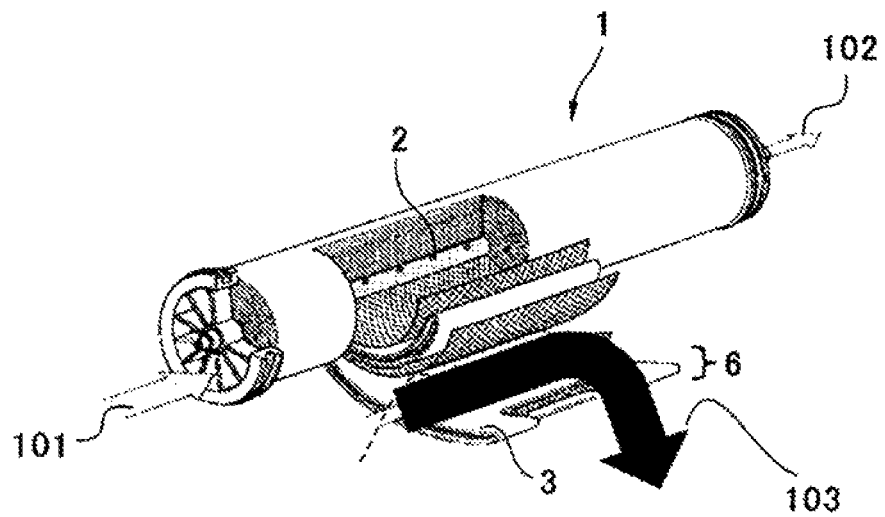
FIG. 2 is an example of an exploded perspective view of a separation membrane element constituting the present invention.

Membranes having separation performance in accordance with a use method, a purpose, etc. is used as separation membranes 3 illustrated in FIG. 1 and so on. The separation membranes 3 may be single-layer membranes or may be composite membranes each including a separation function layer and a base material. In addition, in each composite membrane, a porous support layer may be provided between the separation function layer and the base material.

Here, when each separation membrane 3 is a composite membrane, a surface having a separation function layer is referred to as a feed-side surface, and a surface on the opposite side to the surface having the separation function layer is referred to as a permeate-side surface. The separation membranes 3 in a state where they are disposed such that their feed-side surfaces face each other are referred to as a "separation membrane pair".

<Separation Function Layer>

The separation function layer may be a layer having a separation function and a support function together, or may have only the separation function. Incidentally, the "separation function layer" is referred to as a layer having at least the separation function.

When the separation function layer has both the separation function and the support function, a layer containing, as a main component, a polymer selected from a group consisting of cellulose, polyvinylidene fluoride, polyethersulfone and polysulfone is preferred as the separation function layer.

On the other hand, a layer of a crosslinked polymer is preferred as the separation function layer in terms of easiness in controlling the pore diameter, and excellent durability. Particularly in terms of excellent performance in separation of a component in raw water 101, a polyamide separation function layer obtained by polycondensation of multifunctional amine and multifunctional acid halide, an organic-inorganic hybrid function layer, or the like is preferred. Such a separation function layer can be formed by polycondensation of monomers on a porous support layer.

A separation function layer containing polyamide as a main component can be formed by interfacial polycondensation of multifunctional amine and multifunctional acid halide by a known method. For example, a multifunctional amine aqueous solution is applied onto a porous support layer, and a superfluous multifunctional amine aqueous solution is removed by an air knife or the like. After that, an organic solvent solution containing multifunctional acid halide is applied thereon. Thus, polycondensation occurs to form a polyamide separation function layer.

<Porous Support Layer>

The porous support layer is a layer supporting the separation function layer. When resin is used as a source material for the porous support layer, the porous support layer may be referred to as a porous resin layer.

The source material used as the porous support layer or the shape thereof are not particularly limited. For example, the porous support layer may be formed on a base material out of porous resin. For example, a layer of polysulfone, cellulose acetate, polyvinyl chloride, epoxy resin or a mixture thereof, or a laminate of layers thereof may be used as the porous support layer. A layer containing polysulfone is preferred because it is high in chemical, mechanical and thermal stability and pore diameters thereof can be controlled easily.

The porous support layer containing polysulfone can be, for example, produced by casting an N,N-dimethylformamide solution of polysulfone on a base material (for example, polyester nonwoven fabric formed densely) so as to reach a certain thickness, and wet-coagulating the solution in water.

In addition, the porous support layer may be formed according to a method described in "Office of Saline Water Research and Development Progress Report" No. 359 (1968). Incidentally, the polymer concentration, the solvent temperature, a poor solvent, etc. can be adjusted suitably in order to obtain a desired form.

<Base Material>

The separation membrane 3 may be provided with a base material in terms of strength, dimensional stability, etc. of the separation membrane 3. A fibrous base material is preferably used as the base material in terms of strength and fluid permeability.

For example, filament nonwoven fabric or staple nonwoven fabric can be used as the base material.

(2) Separation Membrane Pair

Figure 3:
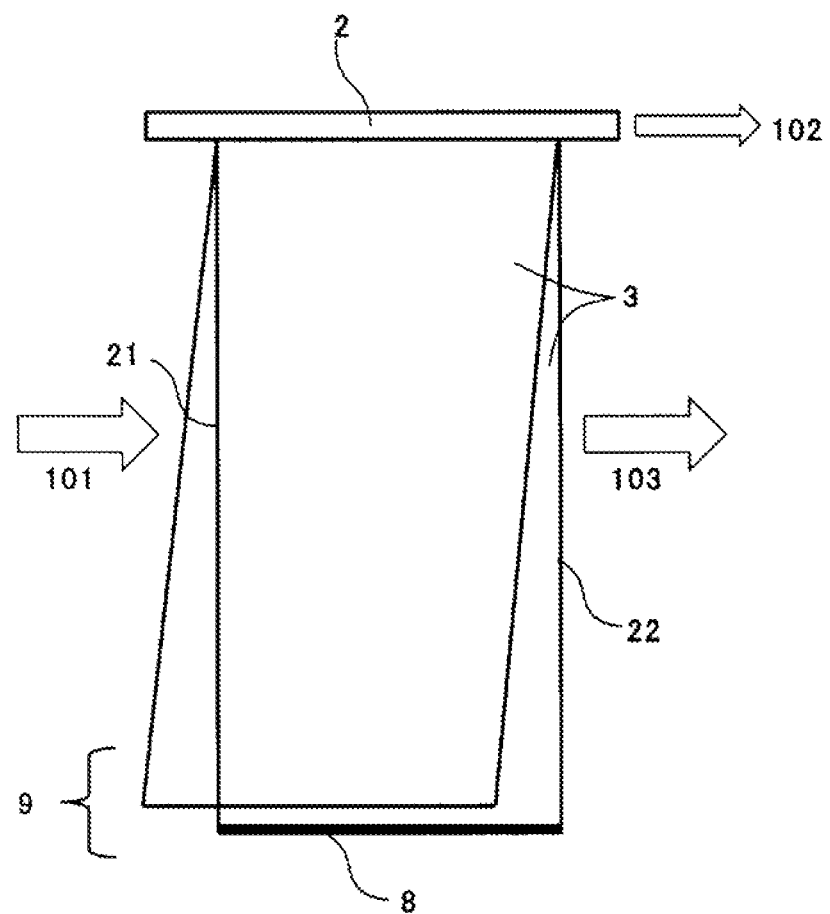
FIG. 3 is an example of a development of a separation membrane element constituting the present invention.

Each separation membrane pair 9 illustrated in FIG. 3 and so on forms a separation membrane leaf together with a feed-side channel material 4 and a permeate-side channel material 5 illustrated in FIG. 1 and so on. Separation membranes 3 are disposed such that their feed-side surfaces face each other through the feed-side channel material 4. In addition, the permeate-side channel material 5 is disposed between the permeate-side surfaces of separation membranes 3 facing each other. Between the permeate-side surfaces, the permeate-side channel is opened only at its inner one side in the winding direction and sealed (closed) at the other three sides so that a permeated fluid 102 can flow into a perforated-water collection tube 2 illustrated in FIG. 1 and so on.

Each separation membrane pair 9 has a rectangular shape. The separation membrane pair 9 is not particularly limited as to the length in the winding direction of the separation membrane pair 9 and the length (width) in the longitudinal direction of the perforated-water collection tube 2. In a second separation membrane element which will be described later, effective width W of the separation membrane pair 9 is preferably 150 mm to 400 mm in order to sufficiently increase the flow rate of a fluid passing through the separation membrane pair 9 to inhibit occurrence of scales or the like.

Incidentally the "effective width W of the separation membrane pair 9" is a value obtained by subtracting the length of a part (sealing portion 8) sealed (closed) by application of a bonding agent, or the like from the width (length in the longitudinal direction of the perforated-water collection tube 2) of the separation membrane pair 9.

In addition, in the second separation membrane element which will be described later, the flow rate of a fluid passing through the separation membrane pair 9 increases with increase in ratio L/W of effective length L to the effective width W of the separation membrane pair 9. It is therefore preferable to increase the ratio L/W in order to inhibit concentration polarization. On the other hand, when the ratio L/W of effective length L to the effective width W of the separation membrane pair 9 is excessively high, pressure loss is increased. In order to keep the separation performance of the separation membrane element even in operation with a high recovery ratio while taking into consideration the balance between the both things, the ratio L/W of effective length L to the effective width W of the separation membrane pair is preferably 2.5 to 8.0 and more preferably 4.0 to 6.0.

Incidentally the "effective length L of the separation membrane pair" is a value obtained by subtracting the length of a part (sealing portion 8) sealed (closed) by application of a bonding agent, or the like from the length of the separation membrane pair 9 in the winding direction.

(3) Feed-Side Channel Material

Each feed-side channel material 4 is disposed to be sandwiched between feed-side surfaces of separation membranes 3 so as to form a channel supplying the raw water 101 to the separation membranes 3 (that is, a feed-side channel). The feed-side channel material 4 is preferably formed into a shape which can disturb the flow of the raw water 101 in order to inhibit the concentration polarization of the raw water 101.

The feed-side channel material 4 may be a member having a continuous shape such as a film, a net, or a member in which convex protrusions are provided on a sheet having pores. Alternatively, the feed-side channel material 4 may be a member having a discontinuous shape showing a projected area ratio higher than 0 and lower than 1 with respect to each separation membrane 3. Further, the feed-side channel material 4 may be able to be separated from the separate membranes 3 or may be firmly attached to the separation membranes 3.

Incidentally, the source material of the feed-side channel material 4 is not particularly limited. The feed-side channel material 4 may be made of the same source material as the separation membranes 3 or may be made of a different source material from that of the separation membranes 3.

In each feed-side channel, it is important to form a channel stably and it is also important to reduce the pressure loss because the amount of fluid passing therethrough is larger than the amount of fluid passing through each permeate-side channel. Therefore, the projected area ratio of each feed-side channel material 4 with respect to each separation membrane 3 is preferably 0.03 to 0.80, more preferably 0.05 to 0.50, and even more preferably 0.08 to 0.35.

The projected area ratio of the feed-side channel material 4 with respect to each separation membrane 3 can be calculated by analysis of an image obtained by photographing the feed-side channel material 4 with a microscope from a direction perpendicular to the membrane surface of the separation membrane 3.

When the thickness of the feed-side channel material 4 is excessively small, the pressure loss in the feed-side channel increases to reduce the separation performance or the desalination rate. On the other hand, when the thickness of the feed-side channel material 4 is excessively large, the membrane area per a separation membrane element becomes small. Therefore, the thickness of the feed-side channel material 4 is preferably 80 μm to 2,000 μm, and more preferably 200 μm to 1,000 μm.

The thickness of the feed-side channel material 4 can be calculated by analysis of an image photographed with a microscope.

(4) Separation Membrane Element

In the membrane separation system of the present invention, a plurality of separation membrane elements have to be connected. In addition, in the membrane separation system of the present invention, the aforementioned separation membrane elements have to include a first separation membrane element and a second separation membrane element. A separation membrane pair belonging to each separation membrane element has a raw water feed portion and a concentrate discharge portion. Based on the positional relationship between the raw water feed portion and the concentrate discharge portion, it is determined whether the separation membrane element corresponds to the first separation membrane element or the second separation membrane element. Some forms of the first separation membrane element or the second separation membrane element will be shown by way of example.

Incidentally, the separation membrane elements are connected in series or in parallel. Here the connection in series means a form of connection in which all the concentrate from one separation membrane element is fed as raw water to the other (one) separation membrane element adjacent thereto. On the other hand, the connection in parallel means a form in which raw water to be fed or concentrate from one separation membrane element is divided so that the divided parts can be fed as raw water of the same quality to separation membrane elements adjacent thereto.

A separation membrane pair belonging to each separation membrane element has a raw water feed portion and a concentrate discharge portion. Based on the positional relationship between the raw water feed portion and the concentrate discharge portion, it is determined whether the separation membrane element corresponds to the first separation membrane element or the second separation membrane element. Some forms of the first separation membrane element or the second separation membrane element will be shown by way of example.

<I-Type Separation Membrane Element>

Description will be made about an I-type separation membrane element which is a first separation membrane element.

A separation membrane pair 9 (forming a feed-side channel) illustrated in the development of FIG. 3 is referred to as an "I-type separation membrane pair".

In the I-type separation membrane pair, an end surface through which the raw water 101 is fed to the separation membrane pair 9 is referred to as a flow-in end surface, and an end surface through which the concentrate 103 is discharged is referred to as a discharge end surface. A separation membrane element in which a separation membrane leaf including a separation membrane pair which is an I-type separation membrane pair is wound is referred to as an "I-type separation membrane element".

The separation membrane pair 9 belonging to the I-type separation membrane element includes a raw water feed portion 21 and a concentrate discharge portion 22 in opposite end portions in the longitudinal direction of the perforated-water collection tube 2, respectively. That is, the I-type separation membrane element corresponds to the first separation membrane element in the membrane separation system of the present invention.

<Reverse L-type Separation Membrane Element>

Description will be made about a reverse L-type separation membrane element which is a form of a second separation membrane element.

Figure 4:
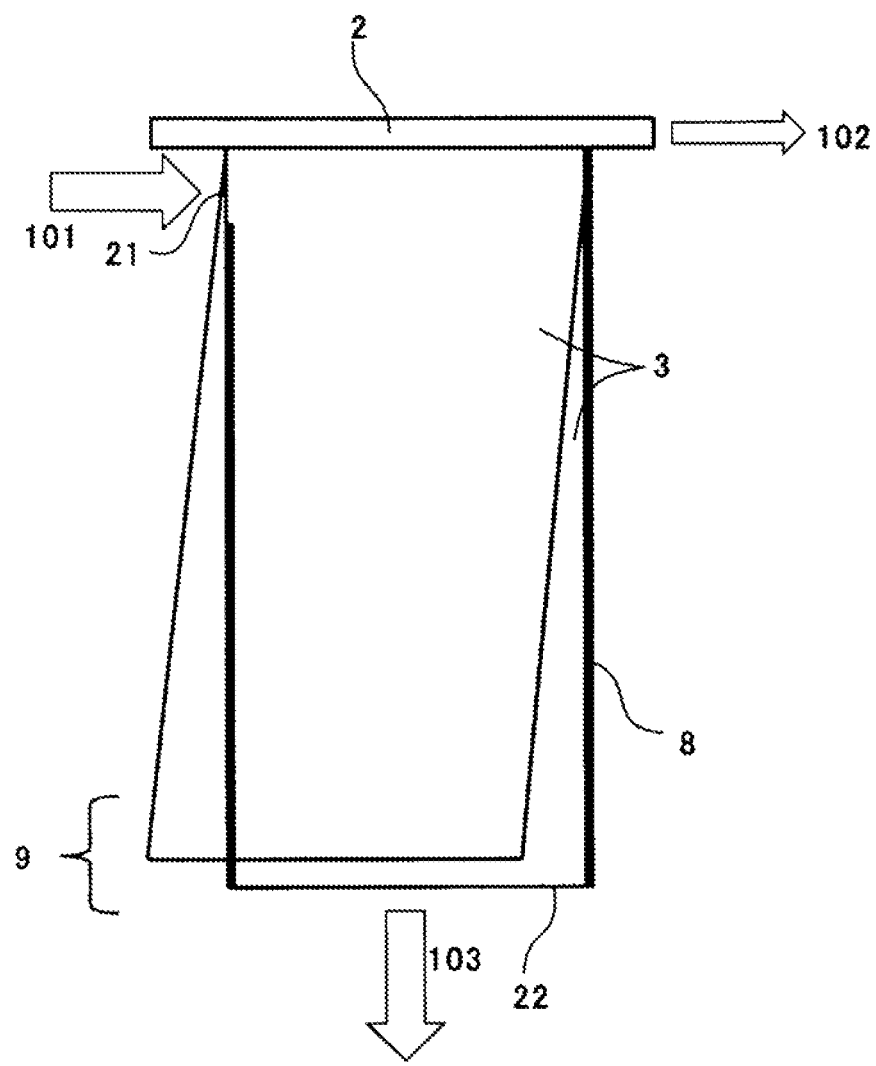
FIG. 4 is an example of a development of a separation membrane element constituting the present invention.

A separation membrane pair 9 (forming a feed-side channel) illustrated in the development of FIG. 4 is referred to as a "reverse L-type separation membrane pair".

In the reverse L-type separation membrane pair, an end surface through which the raw water 101 is fed to the separation membrane pair 9 is referred to as a flow-in end surface, and an outer circumferential end portion through which the concentrate 103 is discharged is referred to as a discharge end portion.

In the reverse L-type separation membrane pair, an end surface on the opposite side to the flow-in end surface has a channel closed ratio of 100%. Here, the "channel closed ratio" is a ratio of a total value of length of a part where the channel is closed by sealing, with respect to the whole length of one end surface or one end portion of the separation membrane pair.

On the other hand, in the flow-in end surface, the channel closed ratio is preferably 0 to 95%, and more preferably 5 to 40%. When the channel closed ratio is higher than 0%, the part where the channel is closed is preferably continuous from the outside to the inside in the winding direction.

The channel closed ratio of the discharge end portion is preferably 0 to 95%, and more preferably 5 to 40%. When the channel closed ratio is higher than 0%, the part where the channel is closed is preferably continuous from the flow-in end surface side in the longitudinal direction of the perforated-water collection tube 2.

When the channel closed ratios of the flow-in end surface and the discharge end portion are within the aforementioned ranges, short path in the feed-side channel can be prevented so that a sufficient amount of a permeated fluid can be obtained.

Incidentally, the channel closed ratio of an inner circumferential end portion of the separation membrane pair 9 in contact with the perforated-water collection tube 2 is 100%.

As a means for sealing an end surface of each separation membrane pair, for example, application of a bonding agent before winding or after winding, or fitting of a cap or a telescope prevention plate after winding can be exemplified.

In addition, as a means for sealing an end portion of each separation membrane, for example, application of a bonding agent or pasting of a tape before winding or after winding, or covering with a film or with a filament winding after winding can be exemplified.

A separation membrane element in which a separation membrane leaf including a separation membrane pair which is a reverse L-type separation membrane pair is wound is referred to as a "reverse L-type separation membrane element".

The reverse L-type separation membrane element includes a reverse L-type separation membrane pair having a concentrate discharge portion 22 in an end portion in a direction perpendicular to the longitudinal direction of the perforated-water collection tube 2. That is, the reverse L-type separation membrane element corresponds to the second separation membrane element in the membrane separation system of the present invention.

<L-type Separation Membrane Element>

Description will be made about an L-type separation membrane element which is another form of the second separation membrane element.

Figure 5:
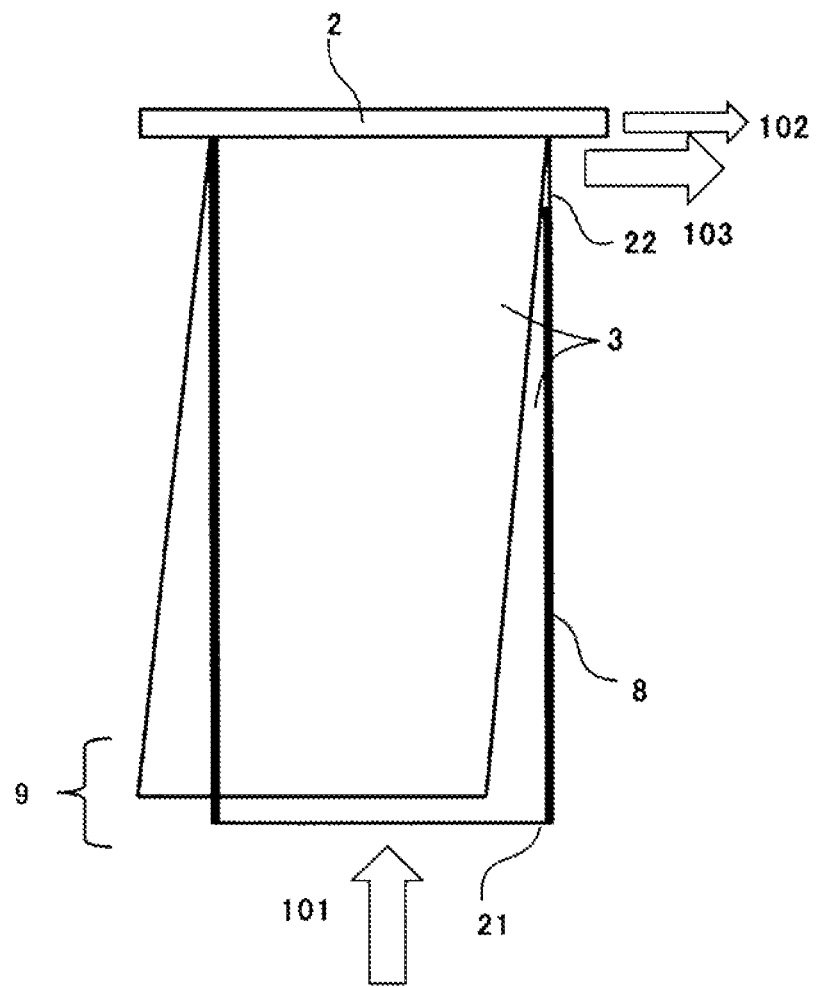
FIG. 5 is an example of a development of a separation membrane element constituting the present invention.

A separation membrane pair 9 (forming a feed-side channel) illustrated in the development of FIG. 5 is referred to as an "L-type separation membrane pair".

In the L-type separation membrane pair, an outer circumferential end portion of the separation membrane pair through which the raw water 101 is fed to the separation membrane pair 9 is referred to as a flow-in end portion, and an end surface through which the concentrate 103 is discharged is referred to as a discharge end surface.

In the L-type separation membrane pair, an end surface on the opposite side to the discharge end surface has a channel closed ratio of 100%.

The channel closed ratio of the flow-in end portion is preferably 0 to 95%, and more preferably 5 to 40%. When the channel closed ratio is higher than 0%, the part where the channel is closed is preferably continuous from the discharge end surface side in the longitudinal direction of the perforated-water collection tube 2.

The channel closed ratio of the discharge end surface is preferably 0 to 95%, and more preferably 5 to 40%. When the channel closed ratio is higher than 0%, the part where the channel is closed is preferably continuous from the outside to the inside in the winding direction.

When the channel closed ratios of the flow-in end portion and the discharge end surface are within the aforementioned ranges, short path in the feed-side channel can be inhibited so that a sufficient amount of a permeated fluid can be obtained.

Incidentally, the channel closed ratio of an inner circumferential end portion of the separation membrane pair 9 is 100%.

A separation membrane element in which a separation membrane leaf including a separation membrane pair which is an L-type separation membrane pair is wound is referred to as an "L-type separation membrane element".

The L-type separation membrane element includes an L-type separation membrane pair having a raw water feed portion 21 in an end portion in a direction perpendicular to the longitudinal direction of the perforated-water collection tube 2. That is, the L-type separation membrane element corresponds to the second separation membrane element in the membrane separation system of the present invention.

<Reverse T-type Separation Membrane Element>

Description will be made about a reverse T-type separation membrane element which is another form of the second separation membrane element.

Figure 6:
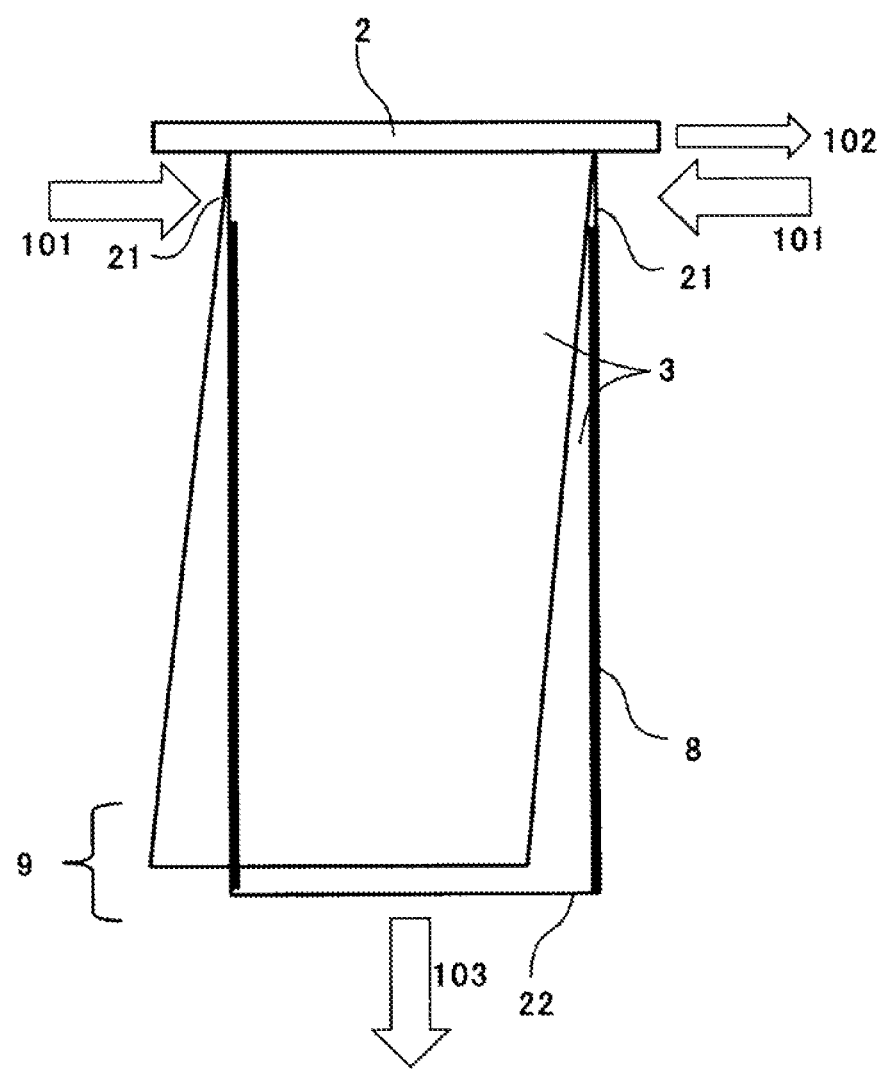
FIG. 6 is an example of a development of a separation membrane element constituting the present invention.

A separation membrane pair 9 illustrated in the development of FIG. 6 is referred to as a "reverse T-type separation membrane pair".

In the reverse T-type separation membrane pair, each of opposite end surfaces through which the raw water 101 is fed to the separation membrane pair 9 is referred to as a flow-in end surface, and an outer circumferential end portion of the separation membrane pair 9 through which the concentrate 103 is discharged is referred to as a discharge end portion.

In the reverse T-type separation membrane pair, a channel closed ratio of the flow-in end surface is preferably 0 to 95%, and more preferably 5 to 40%. When the channel closed ratio is higher than 0%, the part where the channel is closed is preferably continuous from the outside to the inside in the winding direction.

The channel closed ratio of the discharge end portion is preferably 0 to 95%, and more preferably 5 to 40%. When the channel closed ratio is higher than 0%, the part where the channel is closed is preferably continuous from the flow-in end surface side in the longitudinal direction of the perforated-water collection tube 2.

When the channel closed ratios of the flow-in end surface and the discharge end portion are within the aforementioned ranges, short path in the feed-side channel can be prevented so that a sufficient amount of a permeated fluid can be obtained.

Incidentally, the channel closed ratio of an inner circumferential end portion of the separation membrane pair 9 is 100%.

A separation membrane element in which a separation membrane leaf including a separation membrane pair which is a reverse T-type separation membrane pair is wound is referred to as a "reverse T-type separation membrane element".

The reverse T-type separation membrane element includes a reverse T-type separation membrane pair having a concentrate discharge portion 22 in an end portion in a direction perpendicular to the longitudinal direction of the perforated-water collection tube 2. That is, the reverse T-type separation membrane element corresponds to the second separation membrane element in the membrane separation system of the present invention.

<T-type Separation Membrane Element>

Figure 7:
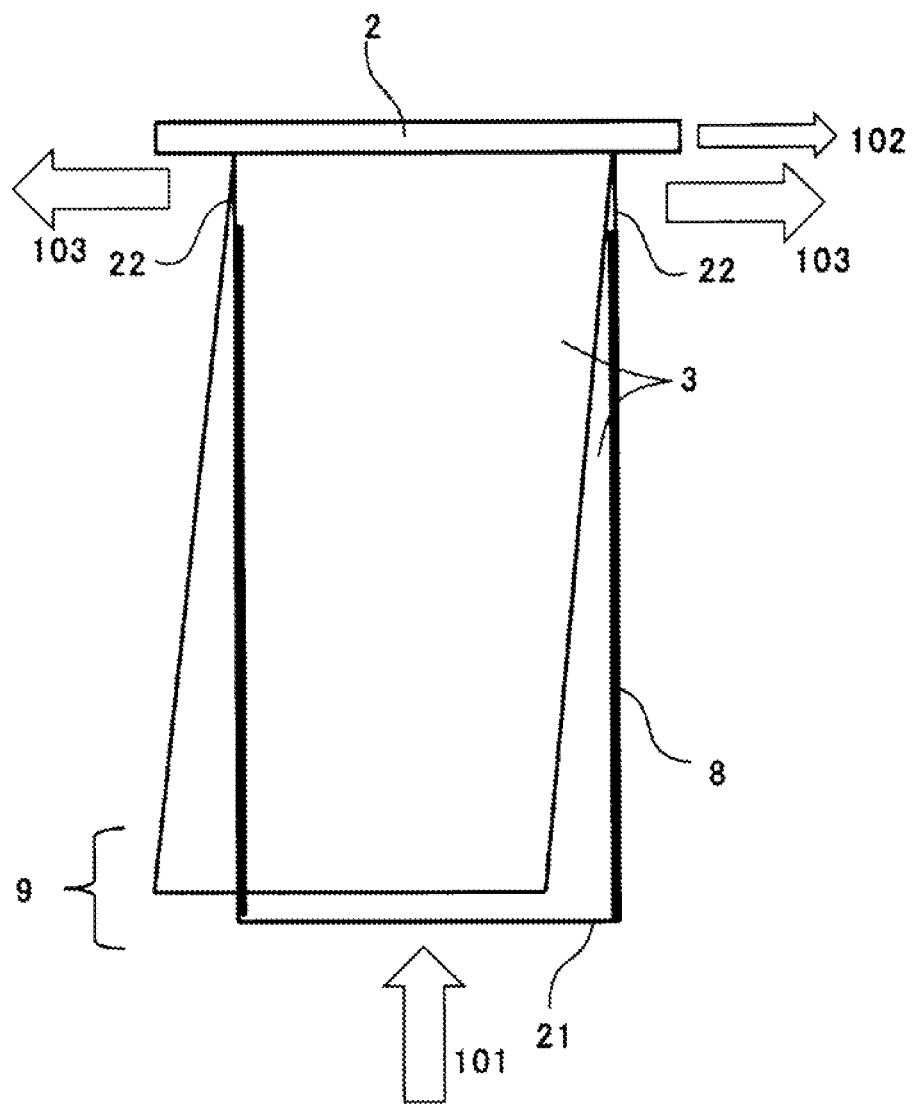
FIG. 7 is an example of a development of a separation membrane element constituting the present invention.

A separation membrane pair 9 illustrated in the development of FIG. 7 is referred to as a "T-type separation membrane pair".

In the T-type separation membrane pair, an outer circumferential end portion of the separation membrane pair 9 through which the raw water 101 is fed to the separation membrane pair 9 is referred to as a flow-in end portion, and an end surface through which the concentrate 103 is discharged is referred to as a discharge end surface.

In the T-type separation membrane pair, the channel closed ratio in the flow-in end portion is preferably 0 to 95%, and more preferably 5 to 40%. When the channel closed ratio is higher than 0%, the part where the channel is closed is preferably continuous from the discharge end surface side in the longitudinal direction of the perforated-water collection tube 2.

The channel closed ratio of the discharge end surface is preferably 0 to 95%. When the channel closed ratio is higher than 0%, the part where the channel is closed is preferably continuous from the outside to the inside in the winding direction.

When the channel closed ratios of the flow-in end portion and the discharge end surface are within the aforementioned ranges, short path in the feed-side channel can be inhibited so that a sufficient amount of a permeated fluid can be obtained.

Incidentally, the channel closed ratio of an inner circumferential end portion of the separation membrane pair 9 is 100%.

A separation membrane element in which a separation membrane leaf including a separation membrane pair which is a T-type separation membrane pair is wound is referred to as a "T-type separation membrane element".

The T-type separation membrane element includes a T-type separation membrane pair having a raw water feed portion 21 in an end portion in a direction perpendicular to the longitudinal direction of the perforated-water collection tube 2. That is, the T-type separation membrane element corresponds to the second separation membrane element in the membrane separation system of the present invention.

<I-type and Reverse L-type Separation Membrane Element>

Description will be made about an I-type-reverse L-type separation membrane element which is another form of the second separation membrane element.

A separation membrane element having both an I-type separation membrane pair and a reverse L-type separation membrane pair is referred to as an "I-type-reverse L-type separation membrane element".

In the I-type-reverse L-type separation membrane element, for example, raw water is supplied from a flow-in end surface of the I-type separation membrane pair, and discharged from a discharge end surface of the I-type separation membrane pair. The concentrate discharged from the I-type separation membrane pair is U-turned in the element by a cap fitted to an end surface of the element. The U-turned concentrate is then fed from a flow-in end surface of the reverse L-type separation membrane pair, and discharged from a discharge end portion of the reverse L-type separation membrane pair. On this occasion, the concentrate discharged from the I-type separation membrane pair serves as raw water to the reverse L-type separation membrane pair.

The cap U-turning the concentrate discharged from the I-type separation membrane pair may be integrated with a cap for sealing the end surface of the separation membrane pair. In addition, an outer circumferential portion of the I-type-reverse L-type separation membrane element is preferably covered with a net or a porous film in order to secure a channel for the concentrate or the like while keeping the shape of the separation membrane element.

The I-type-reverse L-type separation membrane element has a reverse L-type separation membrane pair. That is, the I-type-reverse L-type separation membrane element corresponds to the second separation membrane element in the membrane separation system of the present invention.

The ratio of the I-type separation membrane pair with respect to the entire separation membrane pairs included in the I-type-reverse L-type separation membrane element is preferably 55 to 90% and more preferably 60 to 80% in order to make the concentration and the flow rate of raw water (concentrate discharged from the I-type separation membrane pair) supplied to the reverse L-type separation membrane pair moderate enough to secure the effect of inhibiting concentration polarization in the reverse L-type separation membrane pair.

<L-type-I-type Separation Membrane Element>

Description will be made about an L-type-I-type separation membrane element which is another form of the second separation membrane element.

A separation membrane element having both an L-type separation membrane pair and an I-type separation membrane pair is referred to as an "L-type-I-type separation membrane element".

In the L-type-I-type separation membrane element, for example, raw water is supplied from a flow-in end portion of the L-type separation membrane pair, and discharged from a discharge end surface of the L-type separation membrane pair. The concentrate discharged from the L-type separation membrane pair is U-turned in the element by a cap fitted to an end surface of the element. The U-turned concentrate is then fed from a flow-in end surface of the I-type separation membrane pair, and discharged from a discharge end surface of the I-type separation membrane pair. On this occasion, the concentrate discharged from the L-type separation membrane pair serves as raw water to the I-type separation membrane pair.

The cap U-turning the concentrate discharged from the L-type separation membrane pair may be integrated with a cap for sealing the end surface of the separation membrane pair. In addition, an outer circumferential portion of the L-type-I-type separation membrane element is preferably covered with a net or a porous film in order to secure a channel for the concentrate or the like while keeping the shape of the separation membrane element.

The L-type-I-type separation membrane element has an L-type separation membrane pair. That is, the L-type-I-type separation membrane element corresponds to the second separation membrane element in the membrane separation system of the present invention.

The ratio of the L-type separation membrane pair with respect to the entire separation membrane pairs included in the L-type-I-type separation membrane element is preferably 10 to 45% and more preferably 20 to 40% in order to make the concentration and the flow rate of raw water supplied to the I-type separation membrane pair moderate enough to secure the effect of inhibiting concentration polarization in the I-type separation membrane pair.

<Reverse L-type-L-type Separation Membrane Element>

Description will be made about a reverse L-type-L-type separation membrane element which is another form of the second separation membrane element.

A separation membrane element having both a reverse L-type separation membrane pair and an L-type separation membrane pair is referred to as a "reverse L-type-L-type separation membrane element".

In the reverse L-type-L-type separation membrane element, for example, raw water is supplied from a flow-in end surface of the reverse L-type separation membrane pair, and discharged from a discharge end portion of the reverse L-type separation membrane pair. The concentrate discharged from the reverse L-type separation membrane pair is U-turned in the element by a film or the like covering an outer circumferential portion of the element. The U-turned concentrate is then fed from a flow-in end portion of the L-type separation membrane pair, and discharged from a discharge end surface of the L-type separation membrane pair. On this occasion, the concentrate discharged from the reverse L-type separation membrane pair serves as raw water to the L-type separation membrane pair.

The reverse L-type-L-type separation membrane element has a reverse L-type separation membrane pair and an L-type separation membrane pair. That is, the reverse L-type-L-type separation membrane element corresponds to the second separation membrane element in the membrane separation system of the present invention.

The ratio of the reverse L-type separation membrane pair with respect to the entire separation membrane pairs included in the reverse L-type-L-type separation membrane element is preferably 55 to 90% in order to make the concentration and the flow rate of raw water supplied to the L-type separation membrane pair moderate enough to secure the effect of inhibiting concentration polarization in the L-type separation membrane pair.

(5) Permeate-Side Channel Material

Each permeate-side channel material 5 is disposed to be sandwiched between permeate-side surfaces of separation membranes 3 so as to form a channel (that is, a permeate-side channel) introducing a fluid permeated through the separation membranes 3 to holes of the perforated-water collection tube 2.

The cross-sectional area ratio of the permeate-side channel material 5 is preferably 0.30 to 0.75 and more preferably 0.40 to 0.60 in order to reduce the flow resistance in the permeate-side channel to thereby inhibit each separation membrane 3 from sinking to the permeate-side channel even in pressure filtration and form the permeate-side channel stably. Owing to the reduction in the flow resistance in the permeate-side channel, the flow rate of the raw water particularly in operation with a high recovery ratio can be increased to inhibit concentration polarization or generation of scales.

The cross-sectional area ratio of the permeate-side channel material 5 can be obtained as follows. That is, the permeate-side channel material 5 provided between the permeate-side surfaces of the separation membrane pair 9 constituting the separation membrane element is cut in the longitudinal direction of the perforated-water collection tube 2. The cross-sectional surface of the cut permeate-side channel material 5 is observed by a high-precision shape measuring system. A ratio of an area of the permeate-side channel material 5 between a center line of one convex portion selected at random and a center line of another convex portion adjacent thereto to a product of a distance between the center lines of the two convex portions and the thickness of the permeate-side channel material 5 is calculated. The calculation work is repeated a total of 30 times. After that, an average value of the obtained ratios is regarded as the cross-sectional area ratio of the permeate-side channel material 5.

Incidentally, for example, KS-1100 made by Keyence Corporation is exemplified as the high-precision shape measuring system.

Examples of the permeate-side channel material 5 include a weft knit in which conventional tricot is thickened to expand a channel, a weft knit in which the fiber weight per unit area is reduced, a sheet in which protrusions are disposed on a porous sheet such as nonwoven fabric, and a rugged sheet in which a film or a nonwoven cloth is processed to be rugged.

When the thickness of the permeate-side channel material 5 is excessively small, the pressure loss in the permeate-side channel increases to reduce the separation performance or the desalination rate. On the other hand, when the thickness of the permeate-side channel material 5 is excessively large, the membrane area per separation membrane element is reduced. Therefore, the thickness of the permeate-side channel material 5 is preferably 100 to 500 µm, and more preferably 200 to 400 µm.

The thickness of the permeate-side channel material 5 can be measured directly by a commercially available thickness meter.

Preferably the source material of the permeate-side channel material 5 has a compressive elastic modulus of 100 to 5,000 MPa in order to make it possible to wind the permeate-side channel material 5 around the perforated-water collection tube 2 easily. Examples of the source material having a compressive elastic modulus of 100 to 5,000 MPa include polyester, polyethylene, and polypropylene.

The compressive elastic modulus of the permeate-side channel material 5 can be calculated by performing a compression test with a precision universal tester to create a stress-strain diagram.

The permeate-side channel material 5 used in the first separation membrane element may be different from the permeate-side channel material 5 used in the second separation membrane element.

(6) Perforated-Water Collection Tube

The material and shape of the perforated-water collection tube 2 are not particularly limited as long as it is configured such that the permeated fluid 102 can flow inside the perforated-water collection tube 2. When the outer diameter of the perforated-water collection tube 2 is excessively large, the membrane area per separation membrane element is reduced. On the other hand, when the outer diameter is excessively small, the flow resistance while the permeated fluid 102 flows inside the perforated-water collection tube 2 is increased. The outer diameter of the perforated-water collection tube 2 may be designed suitably in accordance with the flow rate of the permeated fluid 102, but it is preferably 10 to 50 mm, and more preferably 15 to 40 mm.

(7) Vessel

Each separation membrane element constituting the membrane separation system of the present invention may be put into a vessel. The vessel is a container for supplying raw water to the separation membrane element and discharging concentrate therefrom. The inside of the vessel is divided into spaces so that the raw water, the concentrate and permeate cannot be mixed with one another. Incidentally, in an application for desalination of seawater or desalination of brackish water, a plurality of separation membrane elements may be connected in series inside one vessel.

Incidentally, in a reverse L-type-L-type separation membrane element, the concentrate discharged from a reverse L-type separation membrane pair can be U-turned by securing a channel by a combination of an inner wall surface of a vessel and a brine seal.

(8) Membrane Separation System

In the membrane separation system of the present invention, a pump for supplying raw water, a pre-treatment unit for the raw water, a post-treatment unit for permeate, etc. may be connected in addition to the aforementioned plurality of separation membrane elements.

Further, in the membrane separation system of the present invention, the total recovery ratio is preferably 50 to 99%, more preferably 60 to 98%, and even more preferably 75 to 97%. Here, the total recovery ratio is a value calculated by the following Expression (1).

Total recovery ratio (%)=(total flow rate of permeate in membrane separation system (L/min))/(total flow rate of raw water supplied to membrane separation system (L/min))×100     (Expression 1)

<Stage Number of Separation Membrane Element>

When a plurality of separation membrane elements are connected in series, the separation membrane elements are numbered to assign a first stage to the separation membrane element to which raw water is supplied first of all, a second stage to the separation membrane element to which the concentrate from the first stage is supplied, a third stage to the separation membrane element to which the concentrate from the second stage is supplied, . . . , sequentially in the same way. The same numbering way is also applied to a case where a plurality of separation membrane elements are connected in series in a vessel.

When concentrate in the first stage separation membrane element is divided and respectively fed as raw water with equal quality to a plurality of separation membrane elements connected in parallel, a second stage is assigned to each of the separation membrane elements connected in series, a third stage is assigned to each of separation membrane elements to which the concentrate from the second stage is fed, . . . , sequentially in the same way.

Incidentally, assume that there is a difference in the number of separation membrane elements among lines branching from the separation membrane elements connected in parallel in the second stage. In this case, when the branching lines are integrated again, a stage number following the stage number of the branching line including the largest number of separation membrane elements is assigned to a separation membrane element in the integrated line. For example, assume that concentrate in a separation membrane element in the first stage is divided and fed to two separation membrane elements A and B connected in parallel. In this case, assume that the total number of separation membrane elements in a line A including the separation membrane element A is three and the total number of separation membrane elements in a line B including the separation membrane element B is five. When concentrates from those branching lines are integrated and fed to a separation membrane element C, the separation membrane element C is numbered as a sixth stage.

<Layout of Separation Membrane Element>

In the membrane separation system of the present invention, at least one first separation membrane element has to be connected in a stage previous to a second separation membrane element. When the second separation membrane element is connected in a subsequent stage to the first separation membrane element, the concentration in raw water can be increased to secure a sufficient flow rate even in the subsequent stage where the amount of the raw water is reduced, so that generation of scales or the like can be inhibited.

In addition, in the membrane separation system of the present invention, a second separation membrane element is preferably connected in the final stage. When the second separation membrane element is connected in the final stage, even in the final stage where the concentration in raw water is increased to be highest and the amount of the raw water is reduced, a sufficient flow rate can be secured so that generation of scales or the like can be inhibited.

Further, in the membrane separation system of the present invention, it is preferable to include a separation membrane element having a larger winding diameter than the winding diameter of the separation membrane element connected in the final stage, and it is more preferable to include the separation membrane element in a stage previous to the final stage. When the separation membrane element connected in the final stage has a smaller winding diameter, even in the final stage where the concentration in raw water is increased to be highest and the amount of the raw water is reduced, a sufficient flow rate can be secured so that generation of scales or the like can be inhibited.

In addition, in the membrane separation system of the present invention, an intermediate treatment unit may be disposed in the middle of a line through which concentrate in a separation membrane element in a preceding stage is fed to a separation membrane element in a subsequent stage. Examples of such intermediate treatment units include a unit for removing hardness components by use of ion exchange resin, a unit for adding a scale inhibitor, and a unit for removing metal ions by use of an adsorbent having a chelating function.

<Operation Method for Membrane Separation System>

First Embodiment

A membrane separation system having an element unit A for use in a first embodiment of an operation method for a membrane separation system of the present invention includes a means for stopping separation in each separation membrane element constituting the element unit A in accordance with a required amount of permeate from the element unit A.

Here, "stopping separation in each separation membrane element" means stopping supplying raw water (for a second or following stage, concentrate in a separation membrane element in a previous stage) to the separation membrane element, or discharging the whole amount of raw water (for a second or following stage, concentrate in a separation membrane element in a previous stage) supplied to the separation membrane element, as concentrate without permeating any separation membrane. However, when supplying the raw water to the separation membrane element is stopped, separation in any separation membrane elements connected in a subsequent stage to the separation membrane element is also stopped unless an alternative means such as a bypass channel is provided. Therefore, the mode in which the whole amount of the raw water is discharged as concentrate is preferred.

In addition, the "required amount of permeate" means an amount of permeate required per unit time, which can be obtained from the membrane separation system as a whole.

An example of the means for stopping separation in each separation membrane element includes closing a valve provided in an entrance-side line for raw water to the separation membrane element, or closing a valve (permeate rate adjusting valve) provided in an exit-side line for permeate from the separation membrane element.

Incidentally, of separation membrane elements of the entire membrane separation system for use in the present invention, which separation membrane element corresponds to the separation membrane element constituting the element unit A is not determined by fixed criteria. It should be determined suitably in accordance with the mode of the membrane separation system in consideration of a range of the membrane separation system where the required amount of permeate should be judged.

In the first embodiment of the operation method for the membrane separation system of the present invention, separation in a part of the separation membrane elements constituting the element unit A has to be stopped in accordance with the required amount of permeate from the element unit A. To this end, for example, as shown in FIGS. 8 to 11, it can be considered that permeate rate adjusting valves 31, 32, 33 and so on are respectively provided on the exit sides of permeate in each of the separation membrane elements. Alternatively, for example, as shown in FIG. 12, it can be considered that a three-way valve 40 is provided between the entrance side of raw water to a vessel 11 storing a separation membrane element of a first stage and a bypass channel 50 for feeding raw water to a vessel 12 storing a separation membrane element of a second stage. In contrast with a state of high permeate rate where separation is not stopped in any separation membrane element constituting the element unit A, in a state of low permeate rate, separation in a part of the separation membrane elements has to be stopped.

Incidentally, what change in the required amount of permeate should cause to stop separation in a part of the separation membrane elements constituting the element unit A, that is, what criteria should distinguish the "state of high permeate rate" and the "state of low permeate rate" from each other cannot be determined in a fixed manner. For example, it should be determined suitably in accordance with the number, the type or the connection mode of separation membrane elements constituting the element unit A belonging to the membrane separation system for use in the first embodiment of the operation method for the membrane separation system of the present invention, or the concentration of raw water supplied to the element unit A, etc.

When elements connected in the final stage of the element unit A are second separation membrane elements, it is preferable that separation in any of the elements connected in the final stage is continued in the state of low permeate rate. When separation of the second separation membrane elements connected in the final stage is partially continued, a sufficient flow rate can be secured even if the concentration of raw water increases to reduce the amount of the raw water during operation at a high recovery ratio. Thus, generation of scales or the like can be inhibited.

Further, when the winding diameter of each element connected in the final stage of the element unit A is smaller than that in a previous stage, it is preferable that operation in any of the elements connected in the final stage is continued in the state of low permeate rate. When operation of the elements having smaller winding diameters and connected in the final stage is partially continued, a sufficient flow rate can be secured even if the concentration of raw water increases to reduce the amount of the raw water during operation at a high recovery ratio. Thus, generation of scales or the like can be inhibited.

Second Embodiment

In a second embodiment of the operation method for the membrane separation system of the present invention, attention is paid to the quality of raw water supplied to a separation membrane element unit, more specifically to the concentration of a substance X in the raw water, and each of a plurality of separation membrane elements E1 disposed in the separation membrane element unit is changed over to a state S1 or a state S2. Here, the "state S1" is a state in which the separation membrane element E1 separates the feed water into permeate and concentrate and discharges them, and the "state S2" is a state in which the separation membrane element E1 discharges all the amount of the feed water as concentrate. In the state S2 where all the amount of the feed water is discharged as concentrate, the feed water flows into the separation membrane element at a high flow velocity so that concentration polarization in each membrane can be reduced to inhibit organic fouling or scales.

In the second embodiment of the operation method for the membrane separation system of the present invention, the following relation has to be satisfied:

$$N1<N2<N3$$

where N1 designates the number of separation membrane elements E1 in the state S2 when the concentration of the substance X in the raw water supplied to the separation membrane element unit is not smaller than a threshold A, N2 designates the number of separation membrane elements E1 in the state S2 when the concentration of the substance X in the raw water supplied to the separation membrane element unit is smaller than the threshold A, and N3 designates the total number of the separation membrane elements E1. Here, the relation "N2<N3" shows that the second embodiment of the operation method for the membrane separation system of the present invention does not include a simple cleaning process of the membrane separation system as a whole (a state where all the separation membrane elements E1 are changed over to the state S2) but at least one of the separation membrane elements E1 is in the state S1 when the operation method is being carried out. Incidentally, in the second embodiment of the operation method for the membrane separation system of the present invention, any separation membrane element other than the separation membrane elements E1 may be changed over to a state in which all the amount of feed water is discharged as concentrate as in the state S2.

As for the means for changing over each separation membrane element from the state S1 to the state S2, for example, as shown in FIGS. 8 to 13, a valve is provided on the exit-side of the concentrate 103 in each separation membrane element E1 (a vessel in which the separation membrane element E1 is stored) so that all the amount of feed water can be discharged as concentrate by clothing the valve.

Figure 10:
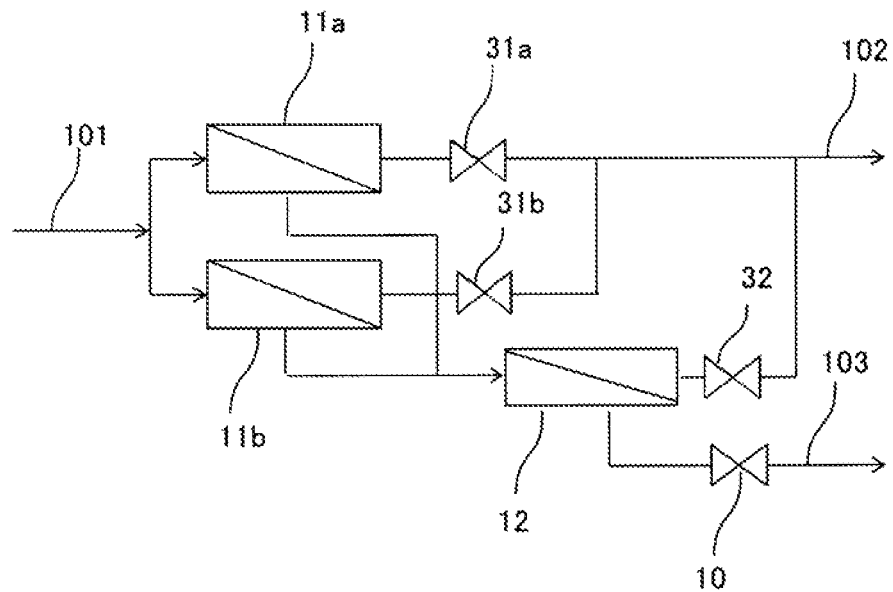
FIG. 10 is an example of a flow chart of a membrane separation system of the present invention.
Figure 11:
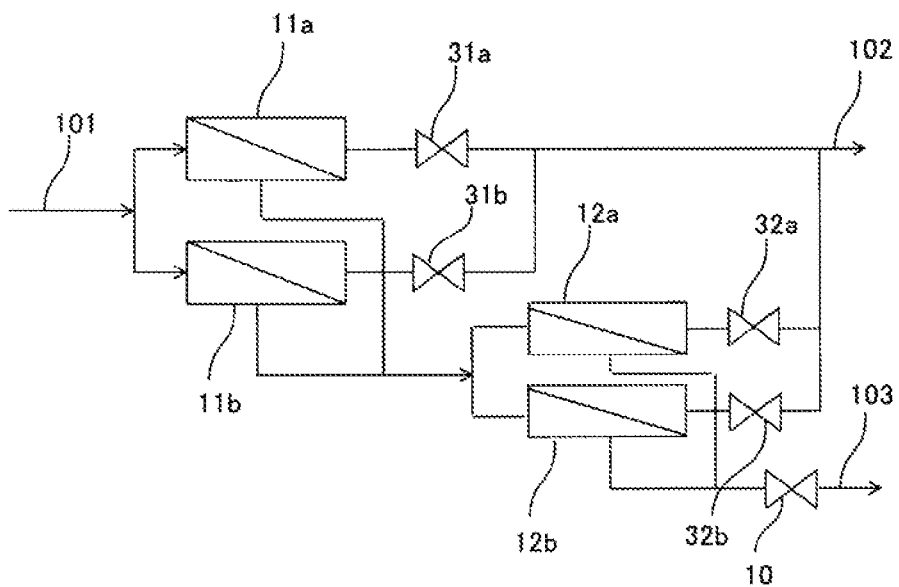
FIG. 11 is an example of a flow chart of a membrane separation system of the present invention.
Figure 12:
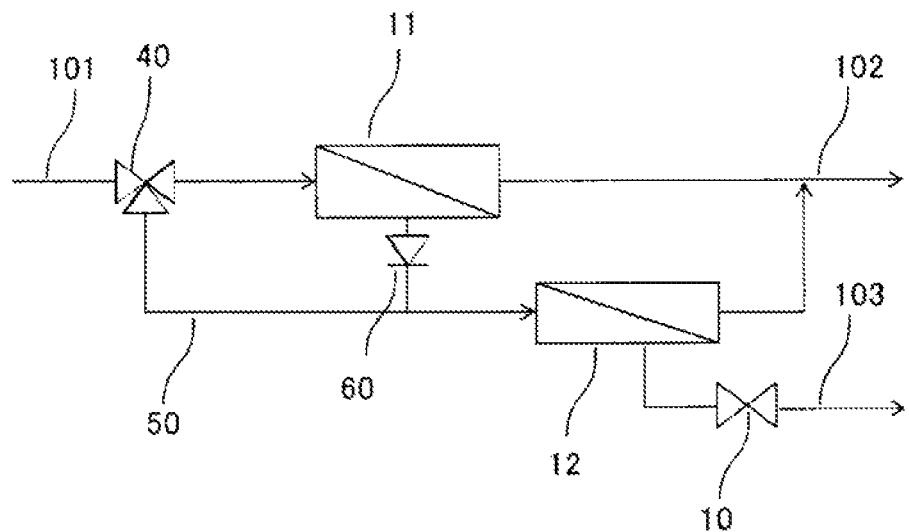
FIG. 12 is an example of a flow chart of a membrane separation system of the present invention.

In addition, in the second embodiment of the operation method for the membrane separation system of the present invention, for example, as shown in FIGS. 10 and 11, it is preferable that a plurality of separation membrane elements E1 are connected in parallel. In such a case, feed water with equal equality is supplied to each of the separation membrane elements. In addition, by changing over the states of the separation membrane elements alternately from S1 to S2 every predetermined period, each of the separation membrane elements can be cleaned uniformly. The aforementioned predetermined period t depends on the configuration of the membrane separation system, but it is preferably 30 minutes or less, more preferably 15 minutes or less, and even more preferably 5 minutes or less.

Further, in the second embodiment of the operation method for the membrane separation system of the present invention, the operating pressure for each separation membrane element may be changed in accordance with the quality of the feed water.

In the second embodiment of the operation method for the membrane separation system of the present invention, the number of separation membrane elements E1 in the state S2 is controlled in accordance with whether the concentration of the substance X in the raw water supplied to the separation membrane element unit is the threshold value A or higher, or lower than the threshold value A. Here, the substance X to which attention is paid is not limited particularly but may be selected suitably in accordance with the quality of the feed water or the like. For example, total dissolved solids (TDS) or calcium and magnesium hardness are exemplified.

Here, two kinds of waters such as rain water and underground water are prepared as raw water. For example, TDS is used as the substance X, and a suitable threshold A is determined between the concentrations in the two waters. The two waters are supplied alternately to the membrane separation system. In this manner, determination about whether the concentration is the threshold value A or higher, or lower than the threshold value A, can be made clearer, so that the membrane separation system can be operated more efficiently.

Not to say, what substance should be selected as the substance X and how the threshold A should be determined for the concentration of the substance are not determined in a fixed manner. For example, they should be determined suitably in accordance with the number, the type or the connection mode of separation membrane elements E1 belonging to the separation membrane element unit to which the present invention is applied, or the type of raw water supplied to the separation membrane element unit, etc.

In addition, a permeate adjusting valve or the like for changing over each separation membrane element E1 between the state S1 and the state S2 may be connected to the membrane separation system to which the second embodiment of the operation method for the membrane separation system of the present invention is applied, or a pump for supplying raw water, a pre-treatment unit for the raw water, a sensor for measuring the quality (such as the concentration of the substance X) of the raw water, a post-treatment unit for permeate, etc. may be connected thereto.

EXAMPLES

The present invention will be described more in detail below along its examples. However, the present invention is not limited to those examples at all.
(Desalination Lowering Rate)

Tap water was used as raw water to be supplied to a membrane separation system. Sampling was performed for 1 minute after operation for 60 minutes under the conditions of an operation pressure of 0.55 MPa and a temperature of 25° C., so as to measure an initial desalination rate (L/min). After that, the desalination rate after operation for 300 hr was measured in the same manner. A desalination lowering rate was calculated by the following expression.

Desalination lowering rate (%)=100×(1−(desalination rate after 300 hr)/(initial desalination rate))

(Recovery Ratio)

The ratio between the amount of raw water supplied for 1 minute and the amount of permeate in the membrane separation system as a whole was regarded as a recovery ratio (%).
(Removal Rate (TDS Removal Rate))

In the membrane separation system, the TDS concentration was obtained by measurement of electric conductivity for the raw water used in operation for 1 minute in the measurement of the desalination rate and sampled permeate. A TDS removal rate was calculated by the following expression.

TDS removal rate (%)=100×(1−(TDS concentration in permeate)/(TDS concentration in raw water))

(Kind of Raw Water)

In Examples 19 to 22 and Comparative Examples 10 to 12, rain water containing 20 mg/L of TDS and underground water containing 1,000 mg/L of TDS were prepared as raw waters to be supplied to the separation membrane element unit belonging to the membrane separation system. The two kinds of raw waters were not mixed at all but supplied to the membrane separation element unit alternately as raw water. In this case, the substance X was TDS, and the threshold value A was set at 200 mg/L as the concentration of TDS.
(Cross-Sectional Area Ratio)

To obtain a cross-sectional area ratio, a permeate-side channel material provided between permeate-side surfaces of a separation membrane pair constituting a separation membrane element was cut in the longitudinal direction of a perforated-water collection tube. The cross-sectional surface of the cut permeate-side channel material was observed by a high-precision shape measuring system. A ratio of an area of the permeate-side channel material between a center line of one convex portion selected at random and a center line of another convex portion adjacent thereto to a product of a distance between the center lines of the two convex portions and the thickness of the permeate-side channel material was calculated. The calculation work was repeated a total of 30 times. After that, an average value of the obtained ratios was regarded as the cross-sectional area ratio of the permeate-side channel material.

KS-1100 made by Keyence Corporation was used as the high-precision shape measuring system.

Example 1

An N,N-dimethylformamide solution with 15.2 mass % of polysulfone was cast on nonwoven fabric (yarn diameter: 1 decitex, thickness: about 0.09 mm, density: 0.80 g/cm$^3$) made of polyethylene terephthalate fiber at a room temperature (25° C.) so as to reach a thickness of 180 μm, then immediately immersed in pure water and left for 5 minutes as it was, and subsequently immersed in hot water at 80° C. for 1 minute. Thus a porous support layer (130 μm thick) made of a fiber-reinforced polysulfone support layer was prepared.

After that, the porous support layer roll was wound, and then immersed in an aqueous solution containing 3.8 mass % of m-phenylenediamine for 2 minutes. The support layer was lifted up slowly in the vertical direction, and nitrogen was sprayed thereto from an air nozzle to remove a surplus aqueous solution from the surface of the support layer. After that, an n-decane solution containing 0.175 mass % of trimesic chloride was applied to the support layer so as to wet the surface of the support layer completely. The support layer was then left at rest for 1 minute. Next, the membrane was held vertically for 1 minute to drain the solution in order to remove a surplus solution from the membrane. After that, the membrane was cleaned with hot water at 90° C. for 2 minutes. Thus, a separation membrane roll was obtained.

The separation membrane obtained thus was cut into six pieces each 1.5 m long and 0.25 m wide, folded and disposed with a net (thickness: 300 μm, pitch: 1.5 mm×1.5 mm) as feed-side channel material such that the inclination angle of yarns constituting the net reached 45° with respect to the winding direction.

Each permeate-side channel material was prepared by applying a composition pellet consisting of 60 mass % of high-crystalline polypropylene (MFR: 1,000 g/min, melting point: 161° C.) and 40 mass % of low-crystalline α-olefin based polymer (low stereospecific polypropylene "L-MODU·S400" (tradename) made by Idemitsu Kosan Co., Ltd.) on a nonwoven cloth. On that occasion, the composition pellet was applied in straight lines onto the nonwoven cloth at a resin temperature of 205° C. and at a traveling speed of 10 m/min by use of an applicator loaded with a comb-like shim having a slit width of 500 μm and a pitch of 900 μm while the temperature of a backup roll was adjusted to 20° C., so as to be perpendicular to the longitudinal direction of the perforated-water collection tube from an inner side end portion to an outer side end portion in the winding direction in the case of making a separation membrane element.

The nonwoven cloth used here had a thickness of 70 μm, a weight of 35 g/m² and an emboss pattern (like a lattice of circles of diameter of φ1.0 mm with a pitch of 5.0 mm). The total thickness of the permeate-side channel material was 270 μm.

The prepared permeate-side channel material was cut, disposed between permeate-sides of separation membranes, and wound spirally around a perforated-water collection tube (width: 350 mm, diameter: 18 mm, number of holes: 10×1 straight line) made of ABS (acrylonitrile-butadiene-styrene), and a water-impermeable film was wound on an outer circumferential end portion thereof. Edges at opposite ends of the obtained winding were cut to produce an I-type separation membrane element having a winding diameter of 3.0 inches.

In addition, the separation membrane obtained thus was separately cut into three pieces each 1.9 m long and 0.25 m wide, folded and disposed with a net (thickness: 300 μm, pitch: 1.5 mm×1.5 mm) as feed-side channel material such that the inclination angle of yarns constituting the net reached 45° with respect to the winding direction. A bonding agent was applied continuously from the outside to the inside in the winding direction such that the channel closed ratio in one end surface of the winding reached 80%. The channel closed ratio in the other end surface was set at 100%, the channel closed ratio in an inner circumferential end portion was set at 100%, and the channel closed ratio in an outer circumferential end portion was set at 0%.

Further, the permeate-side channel material prepared thus was separately cut, disposed between permeate-side surfaces of the separation membranes, and wound spirally around a perforated-water collection tube (width: 350 mm, diameter: 18 mm, number of holes: 10×1 straight line) made of ABS, and a film having concentrate discharge portions was wound on an outer circumferential end portion thereof. As the concentrate discharge portions, four holes each 40 mm wide and 10 mm high were provided in the width direction and height direction respectively at places located over a width of 200 mm at a center portion of the film. Edges at opposite ends of the obtained winding were cut, and a cap was then attached to one end surface of the winding to prepare a reverse L-type separation membrane element having a winding diameter of 2.5 inches.

Figure 8:
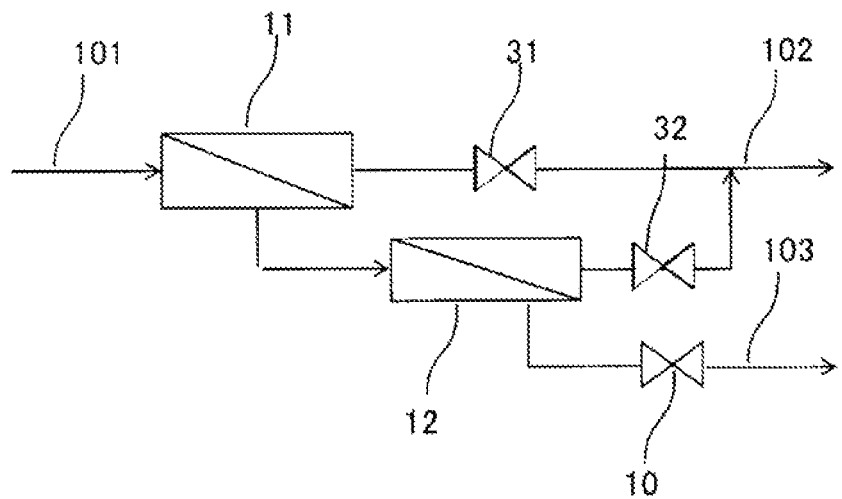
FIG. 8 is an example of a flow chart of a membrane separation system of the present invention.

One I-type separation membrane element was put into a vessel 11, and one reverse L-type separation membrane element was put into another vessel 12. The two vessels were connected in series as shown in FIG. 8. Raw water was supplied to the vessel 11 including the I-type separation membrane element at a recovery ratio of 90%. Each performance was evaluated on the aforementioned conditions. Results were obtained as shown in Table 1.

Example 2

Separation membrane elements and a membrane separation system were prepared in the same manner as in Example 1, except that the width of resin (composition pellet) applied like straight lines on a nonwoven cloth of a permeate-side channel material in a reverse L-type separation membrane element in a second stage was changed to change the cross-sectional area ratio to 0.8. Performance was evaluated, and results were obtained as shown in Table 1.

Example 3

Separation membrane elements and a membrane separation system were prepared in the same manner as in Example 1, except that the width of each separation membrane pair in a reverse L-type separation membrane element in a second stage was changed to 0.5 m, the width of a perforated-water collection tube made of ABS was changed to 550 mm, and an effective width W after cutting edges at opposite ends of an obtained winding was changed to 450 mm to change the value of L/W to 2.0. Performance was evaluated, and results were obtained as shown in Table 1.

Example 4

Separation membrane elements and a membrane separation system were prepared in the same manner as in Example 1, except that the number of separation membrane pairs in a reverse L-type separation membrane element in a second stage was changed from 3 to 4, and the winding diameter was changed to 3.0 inches. Performance was evaluated, and results were obtained as shown in Table 1.

Example 5

Figure 9:
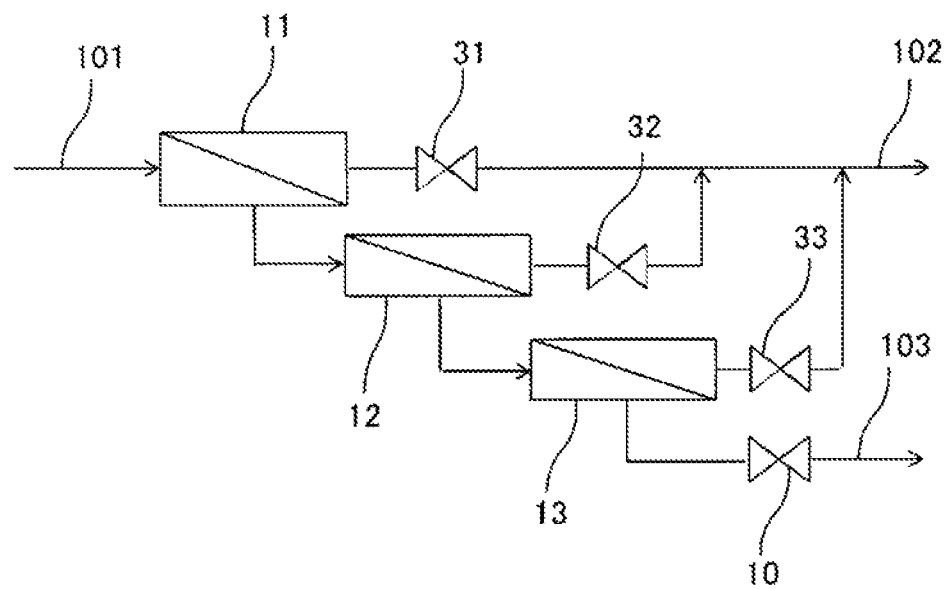
FIG. 9 is an example of a flow chart of a membrane separation system of the present invention.

Separation membrane elements and a membrane separation system were prepared in the same manner as in Example 1, except that a separation membrane pair was cut for four pieces each 1.5 m long and 0.25 m wide, and an I-type separation membrane element having a winding diameter of 2.5 inches was added in a third stage as shown in FIG. 9. Performance was evaluated, and results were obtained as shown in Table 1.

Example 6

Separation membrane elements and a membrane separation system were prepared in the same manner as in Example 1, except that the separation membrane element in the second stage was changed to an L-type separation membrane element (the channel closed ratio in one end surface of the winding was 80%, the channel closed ratio in the other end surface was 100%, the channel closed ratio in an inner circumferential end portion was 100%, and the channel closed ratio in an outer circumferential end portion was 0%). Performance was evaluated, and results were obtained as shown in Table 1.

Example 7

Separation membrane elements and a membrane separation system were prepared in the same manner as in Example 1, except that the separation membrane element in the second stage was changed to a T-type separation membrane element (the channel closed ratio in one end surface of the winding was 90%, the channel closed ratio in the other end surface was 90%, the channel closed ratio in an inner circumferential end portion was 100%, and the channel closed ratio in an outer circumferential end portion was 0%). Performance was evaluated, and results were obtained as shown in Table 1.

Example 8

Separation membrane elements and a membrane separation system were prepared in the same manner as in Example 1, except that the separation membrane element in the second stage was changed to a reverse T-type separation membrane element (the channel closed ratio in one end surface of the winding was 90%, the channel closed ratio in the other end surface was 90%, the channel closed ratio in an inner circumferential end portion was 100%, and the channel closed ratio in an outer circumferential end portion was 0%). Performance was evaluated, and results were obtained as shown in Table 1.

Example 9

Separation membrane elements and a membrane separation system were prepared in the same manner as in Example 1, except that the separation membrane element in the second stage was changed to a reverse L-type-I-type separation membrane element (reverse L-type separation membrane pairs (two pairs): the channel closed ratio in one end surface of the winding was 90%, the channel closed ratio in the other end surface was 100%, the channel closed ratio in an inner circumferential end portion was 100%, and the channel closed ratio in an outer circumferential end portion was 0%, and an I-type separation membrane pair (one pair): the channel closed ratio in one end surface of the winding was 0%, the channel closed ratio in the other end surface was 0%, the channel closed ratio in an inner circumferential end portion was 100%, and the channel closed ratio in an outer circumferential end portion was 0%). Performance was evaluated, and results were obtained as shown in Table 2.

Example 10

Separation membrane elements and a membrane separation system were prepared in the same manner as in Example 1, except that the separation membrane element in the second stage was changed to an L-type-I-type separation membrane element (L-type separation membrane pairs (two pairs): the channel closed ratio in one end surface of the winding was 100%, the channel closed ratio in the other end surface was 90%, the channel closed ratio in an inner circumferential end portion was 100%, and the channel closed ratio in an outer circumferential end portion was 0%, and an I-type separation membrane pair (one pair): the channel closed ratio in one end surface of the winding was 0%, the channel closed ratio in the other end surface was 0%, the channel closed ratio in an inner circumferential end portion was 100%, and the channel closed ratio in an outer circumferential end portion was 0%). Performance was evaluated, and results were obtained as shown in Table 2.

Example 11

Separation membrane elements and a membrane separation system were prepared in the same manner as in Example 1, except that the separation membrane element in the second stage was changed to a reverse L-type-L-type separation membrane element (reverse L-type separation membrane pairs (two pairs): the channel closed ratio in one end surface of the winding was 90%, the channel closed ratio in the other end surface was 100%, the channel closed ratio in an inner circumferential end portion was 100%, and the channel closed ratio in an outer circumferential end portion was 0%, and an L-type separation membrane pair (one pair): the channel closed ratio in one end surface of the winding was 100%, the channel closed ratio in the other end surface was 90%, the channel closed ratio in an inner circumferential end portion was 100%, and the channel closed ratio in an outer circumferential end portion was 0%). Performance was evaluated, and results were obtained as shown in Table 2.

Example 12

Separation membrane elements and a membrane separation system were prepared in the same manner as in Example 1, except that an I-type separation membrane element having a winding diameter of 3.0 inches was added in parallel to the separation membrane element in the first stage as shown in FIG. 10. Performance was evaluated, and results were obtained as shown in Table 2.

Example 13

Separation membrane elements and a membrane separation system were prepared in the same manner as in Example 1, except that an I-type separation membrane element having a winding diameter of 3.0 inches was added in parallel to the separation membrane element in the first stage, and a reverse L-type separation membrane element having a winding diameter of 2.5 inches was added in parallel to the separation membrane element in the second stage, as shown in FIG. 11. Performance was evaluated, and results were obtained as shown in Table 2.

Example 14

Separation membrane elements and a membrane separation system were prepared in the same manner as in Example 1, except that the separation membrane pair of the reverse L-type separation membrane element in the second stage was cut for three pieces each 2.5 m long and 0.25 m wide, the winding diameter was changed to 2.5 inches, and the effective length L was changed to 1.2 m to change L/W to 6.0, as shown in Table 3. Each permeate rate adjusting valve was operated as shown in Table 4, and thus performance was evaluated. Results were obtained as shown in Table 4.

Example 15

A membrane separation system was prepared in the same manner as in Example 1, except that the separation membrane pair of the reverse L-type separation membrane element in the second stage was cut for three pieces each 2.5 m long and 0.25 m wide, the winding diameter was changed to 2.5 inches, and the effective length L was changed to 1.2 m to change L/W to 6.0 as shown in Table 3, while a reverse L-type separation membrane element having a winding diameter of 2.0 inches was added in a third stage as shown in FIG. 9. Each permeate rate adjusting valve was operated as shown in Table 5, and thus performance was evaluated. Results were obtained as shown in Table 5.

Example 16

A membrane separation system was prepared in the same manner as in Example 1, except that the separation membrane pair of the reverse L-type separation membrane element in the second stage was cut for three pieces each 2.5 m long and 0.25 m wide, the winding diameter was changed to 2.5 inches, and the effective length L was changed to 1.2 m to change L/W to 6.0 as shown in Table 3, while an I-type separation membrane element having a winding diameter of 3.0 inches was added in parallel to the membrane separation element in the first stage as shown in FIG. 10. Each permeate rate adjusting valve was operated as shown in Table 6, and thus performance was evaluated. Results were obtained as shown in Table 6.

Example 17

A membrane separation system was prepared in the same manner as in Example 1, except that the separation membrane pair of the reverse L-type separation membrane element in the second stage was cut for three pieces each 2.5 m long and 0.25 m wide, the winding diameter was changed to 2.5 inches, and the effective length L was changed to 1.2 m to change L/W to 6.0 as shown in Table 3, while an I-type separation membrane element having a winding diameter of 3.0 inches was added in parallel to the separation membrane element in the first stage, and a reverse L-type separation membrane element having a winding diameter of 2.5 inches was added in parallel to the separation membrane element in the second stage as shown in FIG. 11. Each permeate rate adjusting valve was operated as shown in Table 7, and thus performance was evaluated. Results were obtained as shown in Table 7.

Example 18

A membrane separation system was prepared in the same manner as in Example 1, except that the separation membrane pair of the reverse L-type separation membrane element in the second stage was cut for three pieces each 2.5 m long and 0.25 m wide, the winding diameter was changed to 2.5 inches, and the effective length L was changed to 1.2 m to change L/W to 6.0 as shown in Table 3, while a three-way valve 40 was placed in an entrance-side line for raw water to a vessel 11 storing the separation membrane element of the first stage, a bypass channel 50 from the three-way valve 40 is connected to an entrance-side line for raw water to a vessel 12 storing the separation membrane element of the second stage, a check valve 60 for preventing water from flowing back to the vessel 11 storing the separation membrane element of the first stage is placed in an exit line for concentrate from the vessel 11 storing the separation membrane element of the first stage, and further the permeate rate adjusting valve 31 and so on was not placed as shown in FIG. 12. The three-way valve was operated as shown in Table 8, and thus performance was evaluated. Results were obtained as shown in Table 8.

Example 19

A membrane separation system was prepared in the same manner as in Example 1, except that the number of reverse L-type separation membrane pairs in the second stage was changed from 3 to 4, and the winding diameter was changed to 3.0 inches, as shown in Table 10. As shown in FIG. 8, a permeate rate adjusting valve 31 and a permeate rate adjusting valve 32 were opened to set each of the two separation membrane elements in the state S1. Underground water was supplied as raw water to the membrane separation system at a raw water rate of 1.0 L/min for 3 hours (0 to 3 hr), at a system recovery ratio of 90%. After that, at the same time as the raw water was changed over to rain water, the permeate rate adjusting valve 32 was closed to change over the separation membrane element in the second stage to the state S2, and the rain water was supplied for 3 hours (3 to 6 hr) as it was.

After that, every three hours, the raw water was changed over between the underground water and the rain water sequentially, and the state of the separation membrane element in the second stage was changed over. This operation was continued until the operation time for each raw water reached a total of 300 hours (3 hours×100 times). The desalination lowering rate after a total of 200 hours was evaluated for each raw water. Results obtained thus are shown in Table 10.

Example 20

A membrane separation system shown in FIG. 8 was prepared in the same manner as in Example 19. Operation and evaluation similar to those in Example 19 except that when rain water was supplied as raw water, the operating states A and B shown in Table 10 were changed over periodically every 5 minutes were performed. Results are shown in Table 10.

Example 21

In the same manner as in Example 19, two I-type separation membrane elements each having a winding diameter of 3.0 inches were prepared. The first I-type separation membrane element was put into a vessel 11 as a separation membrane element E1, and the second I-type separation membrane element was also put into another vessel 11 as a separation membrane element E1. The two vessels 11 were connected in parallel as shown in FIG. 10, so as to constitute a separation membrane element unit together with a permeate rate adjusting valve 31 and a permeate rate adjusting valve 32. Further, one reverse L-type separation membrane element having a winding diameter of 3.0 inches was prepared and put into a vessel 12, and the vessel 12 was connected to the separation membrane element unit as shown in FIG. 10. Thus, a membrane separation system was prepared.

As for the prepared membrane separation system, the initial desalination rate and the initial TDS removal rate were measured and calculated for rain water and underground water sequentially. After that, operation and evaluation similar to those in Example 19 were performed based on operating conditions shown in Table 10. Results are shown in Table 10.

Example 22

In the same manner as in Example 19, two I-type separation membrane elements each having a winding diameter of 3.0 inches were prepared. The first I-type separation membrane element was put into a vessel 11 as a separation membrane element E1, and the second I-type separation membrane element was also put into another vessel 11 as a separation membrane element E1. The two vessels 11 were connected in parallel as shown in FIG. 11, so as to constitute a separation membrane element unit together with a permeate rate adjusting valve 31 and a permeate rate adjusting valve 32. Further, one reverse L-type separation membrane element having a winding diameter of 3.0 inches was prepared and put into a vessel 12, and the vessel 12 was connected in parallel to the separation membrane element unit as shown in FIG. 11. Thus, a membrane separation system was prepared.

As for the prepared membrane separation system, the initial desalination rate and the initial TDS removal rate were measured and calculated for rain water and underground water sequentially. After that, operation and evaluation similar to those in Example 19 were performed based on operating conditions shown in Table 10. Results are shown in Table 10.

Example 23

A membrane separation system was prepared in the same manner as in Example 21, except that the number of separation membrane pairs in the reverse L-type membrane separation element in the second stage was changed from 4 to 3, and the winding diameter was changed to 2.5 inches.

As for the prepared membrane separation system, the initial desalination rate and the initial TDS removal rate were measured and calculated for rain water and underground water sequentially. After that, operation and evaluation similar to those in Example 19 were performed based on operating conditions shown in Table 10. Results are shown in Table 10.

Comparative Example 1

Separation membrane elements and a membrane separation system were prepared in the same manner as in Example 1, except that the separation membrane element in the second stage was changed to an I-type separation membrane element in which the separation membrane pair was cut for three pieces each 1.9 m long and 0.25 m wide, and the winding diameter was set at 2.5 inches. Performance was evaluated, and results were obtained as shown in Table 2.

Comparative Example 2

Separation membrane elements and a membrane separation system were prepared in the same manner as in Example 1, except that the separation membrane element in the first stage was changed to a reverse L-type separation membrane element in which the separation membrane pair was cut for six pieces each 1.5 m long and 0.25 m wide, and the winding diameter was set at 3.0 inches, and the separation membrane element in the second stage was changed to an I-type separation membrane element in which the separation membrane pair was cut for three pieces each 1.9 m long and 0.25 m wide, and the winding diameter was set at 2.5 inches. Performance was evaluated, and results were obtained as shown in Table 2.

Comparative Example 3

Separation membrane elements and a membrane separation system were prepared in the same manner as in Example 1, except that the separation membrane element in the second stage was changed to an I-type separation membrane element in which the separation membrane pair was cut for four pieces each 1.9 m long and 0.25 m wide, and the winding diameter was set at 3.0 inches. Performance was evaluated, and results were obtained as shown in Table 2.

Comparative Example 4

A membrane separation system was prepared in the same manner as in Example 14, except that the separation membrane element in the second stage was changed to an I-type separation membrane element in which the separation membrane pair was cut for two pieces each 2.8 m long and 0.25 m wide, and the winding diameter was set at 2.5 inches. Each permeate rate adjusting valve was not operated but left open. Pressure was adjusted to obtain the same flow rate and the same operating time as those in Example 14, and thus performance was evaluated. Results were obtained as shown in Table 4.

Comparative Example 5

A membrane separation system was prepared in the same manner as in Example 15, except that the separation membrane element in the second stage was changed to an I-type separation membrane element in which the separation membrane pair was cut for two pieces each 2.8 m long and 0.25 m wide, and the winding diameter was set at 2.5 inches, and the separation membrane element in the third stage was changed to an I-type separation membrane element in which the separation membrane pair was cut for one piece 2.8 m long and 0.25 m wide, and the winding diameter was set at 2.0 inches. Each permeate rate adjusting valve was not operated but left open. Pressure was adjusted to obtain the same flow rate and the same operating time as those in Example 15, and thus performance was evaluated. Results were obtained as shown in Table 5.

Comparative Example 6

A membrane separation system was prepared in the same manner as in Example 16, except that the separation membrane element in the second stage was changed to an I-type separation membrane element in which the separation membrane pair was cut for two pieces each 2.8 m long and 0.25 m wide, and the winding diameter was set at 2.5 inches. Each permeate rate adjusting valve was not operated but left open. Pressure was adjusted to obtain the same flow rate and the same operating time as those in Example 16, and thus performance was evaluated. Results were obtained as shown in Table 6.

Comparative Example 7

A membrane separation system was prepared in the same manner as in Example 17, except that the separation membrane element in the second stage was changed to an I-type separation membrane element in which the separation membrane pair was cut for two pieces each 2.8 m long and 0.25 m wide, and the winding diameter was set at 2.5 inches. Each permeate rate adjusting valve was not operated but left open. Pressure was adjusted to obtain the same flow rate and the same operating time as those in Example 17, and thus performance was evaluated. Results were obtained as shown in Table 7.

Comparative Example 8

A membrane separation system was prepared in the same manner as in Example 18, except that the separation membrane element in the second stage was changed to an I-type separation membrane element in which the separation membrane pair was cut for two pieces each 2.8 m long and 0.25 m wide, and the winding diameter was set at 2.5 inches. Each permeate rate adjusting valve was not operated but left open. Pressure was adjusted to obtain the same flow rate and the same operating time as those in Example 18, and thus performance was evaluated. Results were obtained as shown in Table 8.

Comparative Example 9

Figure 13:
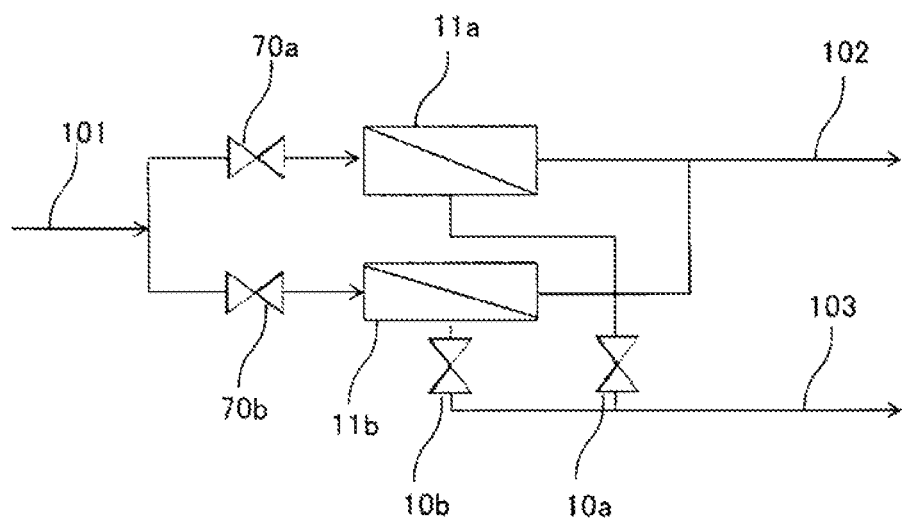
FIG. 13 is an example of a flow chart of a membrane separation system of the present invention.

One I-type separation membrane element prepared in the same manner as in Example 14 was put into a vessel 11a, and one reverse L-type separation membrane element was put into another vessel 11b. The two vessels were connected in series as shown in FIG. 13, thereby preparing a membrane separation system. The details of the membrane separation system are shown in Table 3. Raw water rate adjusting valves 70a and 70b were operated on the aforementioned conditions as shown in Table 9. Performance was thus evaluated, and results were obtained as shown in Table 9.

Comparative Example 10

A water treatment system shown in FIG. 8 was prepared in the same manner as in Example 19, except that the separation membrane element in the second stage was changed to an I-type separation membrane element in which the separation membrane pair was cut for four pieces each 1.9 m long and 0.25 m wide, and the winding diameter was set at 3.0 inches. Operation and evaluation were performed in the same manner as in Example 19, except that when underground water was supplied as raw water, all the amount thereof was supplied to only the separation membrane element in the first stage, and when rain water was supplied as raw water, all the amount thereof was supplied to only the separation membrane element in the second stage. Results were obtained as shown in Table 10.

Comparative Example 11

A membrane separation system shown in FIG. 8 was prepared in the same manner as in Example 19, except that the separation membrane element in the second stage was changed to an I-type separation membrane element in which the separation membrane pair was cut for four pieces each 1.9 m long and 0.25 m wide, and the winding diameter was set at 3.0 inches. Operation and evaluation were performed in the same manner as in Example 19, except that operation was continued while both the separation membrane elements in the first stage and the second stage were left in the state S1. Results were obtained as shown in Table 10.

Comparative Example 12

A membrane separation system shown in FIG. 8 was prepared in the same manner as in Example 19, except that the separation membrane element in the second stage was changed to an I-type separation membrane element in which the separation membrane pair was cut for four pieces each 1.9 m long and 0.25 m wide, and the winding diameter was set at 3.0 inches. Operation and evaluation were performed in the same manner as in Comparative Example 11, except that when underground water was supplied as raw water, operation was performed while both the separation membrane elements in the first stage and the second stage were changed over to the state S2 for 1 hour after the underground water was supplied for two hours. Results were obtained as shown in Table 10.

TABLE 1

| | | | Ex. 1 | Ex. 2 | Ex. 3 | Ex. 4 | Ex. 5 | Ex. 6 | Ex. 7 | Ex. 8 |
|---|---|---|---|---|---|---|---|---|---|---|
| membrane separation system | | — | FIG. 8 | FIG. 8 | FIG. 8 | FIG. 8 | FIG. 9 | FIG. 8 | FIG. 8 | FIG. 8 |
| 1st stage | winding diameter | inch | 3.0 | 3.0 | 3.0 | 3.0 | 3.0 | 3.0 | 3.0 | 3.0 |
| | separation membrane element type | — | I-type | I-type | I-type | I-type | I-type | I-type | I-type | I-type |
| | effective length L of separation membrane pair | mm | 600 | 600 | 600 | 600 | 600 | 600 | 600 | 600 |
| | effective width W of separation membrane pair | mm | 200 | 200 | 200 | 200 | 200 | 200 | 200 | 200 |
| | L/W | — | 3.0 | 3.0 | 3.0 | 3.0 | 3.0 | 3.0 | 3.0 | 3.0 |
| | cross-sectional area ratio of permeate-side channel material | — | 0.6 | 0.6 | 0.6 | 0.6 | 0.6 | 0.6 | 0.6 | 0.6 |
| 2nd stage | winding diameter | inch | 2.5 | 2.5 | 2.5 | 3.0 | 2.5 | 2.5 | 2.5 | 2.5 |
| | separation membrane element type | — | reverse L-type | reverse L-type | reverse L-type | reverse L-type | reverse L-type | L-type | T-type | reverse T-type |
| | effective length L of separation membrane pair | mm | 900 | 900 | 900 | 900 | 900 | 900 | 900 | 900 |
| | effective width W of separation membrane pair | mm | 200 | 200 | 450 | 200 | 200 | 200 | 200 | 200 |
| | L/W | — | 4.5 | 4.5 | 2.0 | 4.5 | 4.5 | 4.5 | 4.5 | 4.5 |
| | cross-sectional area ratio of permeate-side channel material | — | 0.6 | 0.8 | 0.6 | 0.6 | 0.6 | 0.6 | 0.6 | 0.6 |
| 3rd stage | winding diameter | inch | — | — | — | — | 2.5 | — | — | — |
| | separation membrane element type | — | — | — | — | — | I-type | — | — | — |
| | effective length L of separation membrane pair | mm | — | — | — | — | 600 | — | — | — |
| | effective width W of separation membrane pair | mm | — | — | — | — | 200 | — | — | — |
| | L/W | — | — | — | — | — | 3.0 | — | — | — |
| | cross-sectional area ratio of permeate-side channel material | — | — | — | — | — | 0.6 | — | — | — |
| operating conditions | recovery ratio | % | 90 | 90 | 90 | 90 | 90 | 90 | 90 | 90 |
| performance | removal rate | % | 95.6 | 95.2 | 93.2 | 94.9 | 94.1 | 95.1 | 94.7 | 94.8 |
| | desalination lowering rate | % | 19 | 22 | 28 | 21 | 34 | 22 | 26 | 23 |

TABLE 2

|  |  |  | Ex. 9 | Ex. 10 | Ex. 11 | Ex. 12 | Ex. 13 | Comparative Ex. 1 | Comparative Ex. 2 | Comparative Ex. 3 |
|---|---|---|---|---|---|---|---|---|---|---|
| membrane separation system | | — | FIG. 8 | FIG. 8 | FIG. 8 | FIG. 10 | FIG. 11 | FIG. 8 | FIG. 8 | FIG. 8 |
| 1st stage | winding diameter | inch | 3.0 | 3.0 | 3.0 | 3.0 | 3.0 | 3.0 | 3.0 | 3.0 |
| | separation membrane element type | — | I-type | I-type | I-type | I-type | I-type | I-type | reverse L-type | I-type |
| | effective length L of separation membrane pair | mm | 600 | 600 | 600 | 600 | 600 | 600 | 600 | 600 |
| | effective width W of separation membrane pair | mm | 200 | 200 | 200 | 200 | 200 | 200 | 200 | 200 |
| | L/W | — | 3.0 | 3.0 | 3.0 | 3.0 | 3.0 | 3.0 | 6.0 | 6.0 |
| | cross-sectional area ratio of permeate-side channel material | — | 0.6 | 0.6 | 0.6 | 0.6 | 0.6 | 0.6 | 0.6 | 0.6 |
| 2nd stage | winding diameter | inch | 2.5 | 2.5 | 2.5 | 2.5 | 2.5 | 2.5 | 2.5 | 3.0 |
| | separation membrane element type | — | reverse L-type/I-type | L-type/I-type | reverse L-type/L-type | reverse L-type | reverse L-type | I-type | I-type | I-type |
| | effective length L of separation membrane pair | mm | 900 | 900 | 900 | 900 | 900 | 900 | 900 | 900 |
| | effective width W of separation membrane pair | mm | 200 | 200 | 200 | 200 | 200 | 200 | 200 | 200 |
| | L/W | — | 4.5 | 4.5 | 4.5 | 4.5 | 4.5 | 4.5 | 4.5 | 4.5 |
| | cross-sectional area ratio of permeate-side channel material | — | 0.6 | 0.6 | 0.6 | 0.6 | 0.6 | 0.6 | 0.6 | 0.6 |
| 3rd stage | winding diameter | inch | — | — | — | — | — | — | — | — |
| | separation membrane element type | — | — | — | — | — | — | — | — | — |
| | effective length L of separation membrane pair | mm | — | — | — | — | — | — | — | — |
| | effective width W of separation membrane pair | mm | — | — | — | — | — | — | — | — |
| | L/W | — | — | — | — | — | — | — | — | — |
| | cross-sectional area ratio of permeate-side channel material | — | — | — | — | — | — | — | — | — |
| operating conditions | recovery ratio | % | 90 | 90 | 90 | 90 | 90 | 90 | 90 | 90 |
| performance | removal rate | % | 95.8 | 95.7 | 96.1 | 95.8 | 95.6 | 91.2 | 92.0 | 90.2 |
| | desalination lowering rate | % | 18 | 19 | 16 | 17 | 19 | 42 | 39 | 52 |

TABLE 3

|  |  |  | Ex. 14 | Ex. 15 | Ex. 16 | Ex. 17 | Ex. 18 | Comparative Ex. 4 | Comparative Ex. 5 |
|---|---|---|---|---|---|---|---|---|---|
| membrane separation system | | — | FIG. 8 | FIG. 9 | FIG. 10 | FIG. 11 | FIG. 12 | FIG. 8 | FIG. 9 |
| 1st stage | number of pairs | pair | 1 | 1 | 2 | 2 | 1 | 1 | 1 |
| | winding diameter | inch | 3.0 | 3.0 | 3.0 | 3.0 | 3.0 | 3.0 | 3.0 |
| | separation membrane element type | — | I-type | I-type | I-type | I-type | I-type | I-type | I-type |
| | effective length L of separation membrane pair | mm | 600 | 600 | 600 | 600 | 600 | 600 | 600 |
| | effective width W of separation membrane pair | mm | 200 | 200 | 200 | 200 | 200 | 200 | 200 |
| | L/W | — | 3.0 | 3.0 | 3.0 | 3.0 | 3.0 | 3.0 | 3.0 |
| | cross-sectional area ratio of permeate-side channel material | — | 0.6 | 0.6 | 0.6 | 0.6 | 0.6 | 0.6 | 0.6 |
| 2nd stage | number of pairs | pair | 1 | 1 | 1 | 2 | 1 | 1 | 1 |
| | winding diameter | inch | 2.5 | 2.5 | 2.5 | 2.5 | 2.5 | 2.5 | 2.5 |
| | separation membrane element type | — | reverse L-type | reverse L-type | reverse L-type | reverse L-type | reverse L-type | I-type | I-type |
| | effective length L of separation membrane pair | mm | 1200 | 1200 | 1200 | 1200 | 1200 | 1200 | 1200 |
| | effective width W of separation membrane pair | mm | 200 | 200 | 200 | 200 | 200 | 200 | 200 |
| | L/W | — | 6.0 | 6.0 | 6.0 | 6.0 | 6.0 | 6.0 | 6.0 |
| | cross-sectional area ratio of permeate-side channel material | — | 0.6 | 0.6 | 0.6 | 0.6 | 0.6 | 0.6 | 0.6 |
| 3rd stage | number of pairs | pair | — | 1 | — | — | — | — | 1 |
| | winding diameter | inch | — | 2.0 | — | — | — | — | 2.0 |
| | separation membrane element type | — | — | reverse L-type | — | — | — | — | I-type |
| | effective length L of separation membrane pair | mm | — | 1300 | — | — | — | — | 1300 |
| | effective width W of separation membrane pair | mm | — | 200 | — | — | — | — | 200 |
| | L/W | — | — | 6.5 | — | — | — | — | 6.5 |
| | cross-sectional area ratio of permeate-side channel material | — | — | 0.6 | — | — | — | — | 0.6 |
| number of flow rate variable stages | | — | 2 | 4 | 3 | 6 | 2 | 2 | 4 |

TABLE 4

|  |  | Ex. 14 |  | Comparative Ex. 4 |
|---|---|---|---|---|
| permeate rate adjusting valve | 31 | open | closed | open |
|  | 32 | open | open | open |
| pressure | MPa | 0.55 | 0.55 | 0.21-0.55 |
| recovery ratio | % | 90 | 90 | 90 |
| initial desalination rate | L/min | 1.85 | 0.58 | 0.58-1.85 |
| removal rate | % | 95.8 | 94.6 | 92.5-95.8 |
| operating time | h | 100 | 100 | 200 |
| desalination lowering rate | % | 15.1 |  | 26.2 |

TABLE 5

|  |  | Ex. 15 |  |  |  | Comparative Ex. 5 |
|---|---|---|---|---|---|---|
| permeate rate adjusting valve | 31 | open | open | closed | closed | open |
|  | 32 | open | closed | open | closed | open |
|  | 33 | open | open | open | open | open |
| pressure | MPa | 0.55 | 0.55 | 0.55 | 0.55 | 0.12-0.55 |
| recovery ratio | % | 90 | 90 | 90 | 90 | 90 |
| initial desalination rate | L/min | 2.15 | 1.55 | 0.89 | 0.28 | 0.28-2.15 |
| removal rate | % | 96.5 | 95.4 | 96.0 | 94.5 | 92.0-96.5 |
| operating time | h | 50 | 50 | 50 | 50 | 200 |
| desalination lowering rate | % | 14.0 |  |  |  | 27.3 |

TABLE 6

|  |  | Ex. 16 |  |  | Comparative Ex. 6 |
|---|---|---|---|---|---|
| permeate rate adjusting valve | 31a | open | open | closed | open |
|  | 31b | open | closed | closed | open |
|  | 32 | open | open | open | open |
| pressure | MPa | 0.55 | 0.55 | 0.55 | 0.13-0.55 |
| recovery ratio | % | 90 | 90 | 90 | 90 |
| initial desalination rate | L/min | 3.14 | 1.85 | 0.58 | 0.58-3.14 |
| removal rate | % | 95.5 | 95.8 | 94.3 | 92.0-95.5 |
| operating time | h | 70 | 65 | 65 | 200 |
| desalination lowering rate | % | 14.5 |  |  | 27.0 |

TABLE 7

|  |  | Ex. 17 |  |  |  |  |  | Comparative Ex. 7 |
|---|---|---|---|---|---|---|---|---|
| permeate rate adjusting valve | 31a | open | open | open | open | closed | closed | open |
|  | 31b | open | open | closed | closed | closed | closed | open |
|  | 32a | open | open | open | open | open | closed | open |
|  | 32b | open | closed | open | closed | open | open | open |
| pressure | MPa | 0.55 | 0.55 | 0.55 | 0.55 | 0.55 | 0.55 | 0.12-0.55 |
| recovery ratio | % | 90 | 90 | 90 | 90 | 90 | 90 | 90 |
| initial desalination rate | L/min | 3.71 | 3.14 | 2.42 | 1.85 | 1.14 | 0.58 | 0.58-3.71 |
| removal rate | % | 96.0 | 95.3 | 96.2 | 95.9 | 94.2 | 94.3 | 91.9-96.0 |
| operating time | h | 35 | 35 | 35 | 35 | 30 | 30 | 200 |
| desalination lowering rate | % | 12.1 |  |  |  |  |  | 25.5 |

TABLE 8

|  |  | Ex. 18 |  | Comparative Ex. 8 |
|---|---|---|---|---|
| three-way valve | 40 | 1st stage direction | 2nd stage direction | 1st stage direction |
| pressure | MPa | 0.55 | 0.55 | 0.21-0.55 |
| recovery ratio | % | 90 | 90 | 90 |
| initial desalination rate | L/min | 1.83 | 0.59 | 0.59-1.83 |
| removal rate | % | 95.9 | 94.9 | 92.2-95.9 |
| operating time | h | 100 | 100 | 200 |
| desalination lowering rate | % | 15.5 |  | 26.5 |

TABLE 9

|  |  | Comparative Ex. 9 |  |
|---|---|---|---|
| raw water rate adjusting valve | 70a | open | closed |
|  | 70b | open | open |
| pressure | MPa | 0.55 | 0.55 |
| recovery ratio | % | 90 | 90 |
| initial desalination rate | L/min | 1.61 | 0.59 |
| removal rate | % | 92.9 | 94.5 |
| operating time | h | 100 | 100 |
| desalination lowering rate | % | 20.1 |  |

TABLE 10

| | | | Ex. 19 | | Ex. 20 | | | Ex. 21 | | Ex. 22 | |
|---|---|---|---|---|---|---|---|---|---|---|---|
| membrane separation system | | — | FIG. 8 | | FIG. 8 | | | FIG. 10 | | FIG. 11 | |
| raw water | | — | underground water | rain water | underground water | rain water | | underground water | rain water | underground water | rain water |
| operating time | | hr | 0-3 | 3-6 | 0-3 | 3-6 | | 0-3 | 3-6 | 0-3 | 3-6 |
| whole | | raw water rate | L/min | 1.0 | | 1.0 | | | 1.5 | | 2.0 | |
| | | total number of separation membrane elements | — | 2 | | 2 | | | 3 | | 4 | |
| | | operating state | — | — | | — | A | B | — | | — | |
| 1st stage separation membrane element | 1st | state | — | S1 | | S1 | S1 | S2 | S1 | | S1 | |
| | | recovery ratio | % | 60 | 90 | 60 | 90 | 0 | 60 | 90 | 60 | 60 |
| | | winding diameter | inch | 3.0 | | 3.0 | | | 3.0 | | 3.0 | |
| | | type | — | I-type | | I-type | | | I-type | | I-type | |
| | 2nd | state | — | | | | | | S1 | S1 | S1 | S1 |
| | | recovery ratio | % | | | | | | 60 | 90 | 60 | 60 |
| | | winding diameter | inch | | | | | | 3.0 | | 3.0 | |
| | | type | — | | | | | | I-type | | I-type | |
| 2nd stage separation membrane element | 1st | state | — | S1 | S2 | S1 | S2 | S1 | S1 | S2 | S1 | S1 |
| | | recovery ratio | % | 75 | 0 | 60 | 0 | 90 | 75 | 0 | 75 | 75 |
| | | winding diameter | inch | 3.0 | | 3.0 | | | 3.0 | | 3.0 | |
| | | type | — | reverse L-type | | reverse L-type | | | reverse L-type | | reverse L-type | |
| | 2nd | state | — | | | | | | | | S1 | S2 |
| | | recovery ratio | % | | | | | | | | 75 | 0 |
| | | winding diameter | inch | | | | | | | | 3.0 | |
| | | type | — | | | | | | | | reverse L-type | |
| operating conditions | | system recovery ratio | % | 90 | | 90 | | | 90 | | 90 | |
| | | initial desalination rate | L/min | 0.9 | 0.9 | 0.9 | 0.9 | | 1.35 | 1.35 | 1.8 | 1.8 |
| performance | | removal rate | % | 93.5 | 98.8 | 93.5 | 98.8 | | 94.0 | 98.9 | 94.5 | 99.0 |
| | | desalination lowering rate | % | 17.0 | 1.0 | 15.0 | 1.0 | | 13.0 | 1.0 | 11.0 | 1.0 |

| | | | Ex. 23 | | Comparative Ex. 10 | | Comparative Ex. 11 | | Comparative Ex. 12 | | |
|---|---|---|---|---|---|---|---|---|---|---|---|
| membrane separation system | | — | FIG. 10 | | FIG. 8 | | FIG. 8 | | FIG. 8 | | |
| raw water | | — | underground water | rain water | underground water | rain water | underground water | rain water | underground water | | rain water |
| operating time | | hr | 0-3 | 3-6 | 0-3 | 3-6 | 0-3 | 3-6 | 0-2 | 2-3 | 3-6 |
| whole | | raw water rate | L/min | 1.5 | | 1.0 | | 1.0 | | 1.0 | 0.1 | 1.0 |
| | | total number of separation membrane elements | — | 3 | | 2 | | 2 | | 2 | | |
| | | operating state | — | — | | — | | — | | — | | |
| 1st stage separation membrane element | 1st | state | — | S1 | | S1 | — | S1 | | S1 | S2 | S1 |
| | | recovery ratio | % | 60 | 90 | 90 | — | 60 | 60 | 60 | 0 | 90 |
| | | winding diameter | inch | 3.0 | | 3.0 | | 3.0 | | 3.0 | | 3.0 |
| | | type | — | I-type | | I-type | | I-type | | I-type | | I-type |
| | 2nd | state | — | S1 | S1 | | | | | | | |
| | | recovery ratio | % | 60 | 90 | | | | | | | |
| | | winding diameter | inch | 3.0 | | | | | | | | |
| | | type | — | I-type | | | | | | | | |
| 2nd stage separation membrane element | 1st | state | — | S1 | S2 | — | S1 | S1 | | S1 | S2 | S1 |
| | | recovery ratio | % | 75 | 0 | — | 90 | 75 | 75 | 75 | 0 | 90 |
| | | winding diameter | inch | 2.5 | | 3.0 | | 3.0 | | 3.0 | | |
| | | type | — | reverse L-type | | I-type | | I-type | | I-type | | |
| | 2nd | state | — | | | | | | | | | |
| | | recovery ratio | % | | | | | | | | | |
| | | winding diameter | inch | | | | | | | | | |
| | | type | — | | | | | | | | | |
| operating conditions | | system recovery ratio | % | 90 | | 90 | | 90 | | 90 | 0 | 90 |
| | | initial desalination rate | L/min | 1.20 | 1.20 | 0.9 | 0.9 | 0.9 | 0.9 | 0.9 | 0.0 | 0.9 |
| performance | | removal rate | % | 95.0 | 99.0 | 78.0 | 98.8 | 92.0 | 98.8 | 92.0 | — | 98.8 |
| | | desalination lowering rate | % | 8.0 | 1.0 | 40.0 | 1.0 | 45.0 | 1.0 | 25.0 | | 1.0 |

INDUSTRIAL APPLICABILITY

According to a membrane separation system and an operation method for the membrane separation system of the present invention, influence of reduction in separation performance and life length caused by concentration of a separated component in raw water can be reduced even in operation performed at a high recovery ratio, and operation can be performed stably for a long time while keeping high desalination rate and high separation performance.

Although the present invention has been described in detail and with reference to specific embodiments, it is obvious for those in the art that various changes or modifications can be made without departing from the spirit and scope of the present invention.

The present application is based on a Japanese patent application (Japanese Patent Application No. 2018-10253) filed on Jan. 25, 2018, and a Japanese patent application (Japanese Patent Application No. 2018-31533) filed on Feb. 26, 2018, the contents of which are incorporated herein by reference.

REFERENCE SIGNS LIST 1 separation membrane element
2 perforated-water collection tube 3 separation membrane
4 feed-side channel material
5 permeate-side channel material
6 separation membrane leaf
6 winding
7 sealing portion
8 separation membrane pair
10, 10a, 10b concentrate rate adjusting valve
11, 11a, 11b vessel storing separation membrane element (first stage)
12, 12a, 12b vessel storing separation membrane element (second stage)
13 vessel storing separation membrane element (third stage)
21 raw water feed portion
22 concentrate discharge portion
31, 31a, 31b permeate rate adjusting valve (first stage)
32, 32a, 32b permeate rate adjusting valve (second stage)
33 permeate rate adjusting valve (third stage)
40 three-way valve
50 bypass channel
60 check valve
70a, 70b raw water rate adjusting valve
101 raw water
102 permeate
103 concentrate

The invention claimed is:

1. A membrane separation system comprising a plurality of separation membrane elements connected to one another, each of the separation membrane elements comprising:
a perforated-water collection tube;
a plurality of separation membrane pairs, each separation membrane pair comprising separation membranes each having a feed-side surface and a permeate-side surface and disposed such that the feed-side surfaces face each other;
a feed-side channel material provided between the feed-side surfaces of the separation membrane pairs; and
a permeate-side channel material provided between the permeate-side surfaces of the separation membrane pairs,
wherein
the separation membrane pairs, the feed-side channel material and the permeate-side channel material are spirally wound around the perforated-water collection tube,
the plurality of separation membrane elements comprise a first separation membrane element and a second separation membrane element,
the separation membrane pair included in the first separation membrane element comprises a raw water feed portion and a concentrate discharge portion respectively in opposite end portions in a longitudinal direction of the perforated-water collection tube,
the separation membrane pair included in the second separation membrane element comprises a raw water feed portion or a concentrate discharge portion in an end portion in a direction perpendicular to the longitudinal direction of the perforated-water collection tube, and
at least one first separation membrane element serves as a stage preceding the second separation membrane element.

2. The membrane separation system according to claim 1, wherein the second separation membrane element serves as a final stage.

3. The membrane separation system according to claim 1, comprising the separation membrane element having a larger winding diameter than a winding diameter of the separation membrane element of the final stage.

4. The membrane separation system according to claim 1, comprising the second separation membrane element having an effective width W of the separation membrane pair of 150 mm to 400 mm.

5. The membrane separation system according to claim 1, comprising the second separation membrane element having a ratio L/W of an effective length L of the separation membrane pair to the effective width W of the separation membrane pair of 2.5 to 8.0.

6. The membrane separation system according to claim 1, comprising the separation membrane element having a cross-sectional area ratio of the permeate-side channel material of 0.30 to 0.75.

7. An operation method for a membrane separation system comprising an element unit A comprising a plurality of separation membrane elements connected to one another in series, each of the separation membrane elements comprising:
a perforated-water collection tube;
a plurality of separation membrane pairs, each separation membrane pair comprising separation membranes each having a feed-side surface and a permeate-side surface and disposed such that the feed-side surfaces face each other;
a feed-side channel material provided between the feed-side surfaces of the separation membrane pairs; and
a permeate-side channel material provided between the permeate-side surfaces of the separation membrane pairs,
wherein
the separation membrane pairs, the feed-side channel material and the permeate-side channel material are spirally wound around the perforated-water collection tube,
the element unit A comprises a first separation membrane element and a second separation membrane element,
the separation membrane pair included in the first separation membrane element comprises a raw water feed portion and a concentrate discharge portion respectively in opposite end portions in a longitudinal direction of the perforated-water collection tube,
the separation membrane pair included in the second separation membrane element comprises a raw water feed portion or a concentrate discharge portion in an end portion in a direction perpendicular to the longitudinal direction of the perforated-water collection tube, and
at least one first separation membrane element serves as a stage preceding the second separation membrane element, and
wherein
a separation in a part of the separation membrane elements constituting the membrane separation system is suspended in accordance with a required amount of permeate in the membrane separation system.

8. The operation method for a membrane separation system according to claim 7, wherein the second separation membrane element serves as a final stage of the element unit A, and the second separation membrane element of the final stage is not suspended.

9. An operation method for a membrane separation system comprising a separation membrane element unit comprising a plurality of separation membrane elements E1 disposed therein, each of the separation membrane elements E1 comprising:

a perforated-water collection tube;
a plurality of separation membrane pairs, each separation membrane pair comprising separation membranes each having a feed-side surface and a permeate-side surface and disposed such that the feed-side surfaces face each other;
a feed-side channel material provided between the feed-side surfaces of the separation membrane pairs; and
a permeate-side channel material provided between the permeate-side surfaces of the separation membrane pairs,
wherein
the separation membrane pairs, the feed-side channel material and the permeate-side channel material are spirally wound around the perforated-water collection tube,
each of the plurality of separation membrane elements E1 is capable of being changed over between a state S1 in which a feed water is separated into a permeate and a concentrate and discharged and a state S2 in which an all of the feed water is discharged as the concentrate,
the plurality of the separation membrane elements E1 comprise a first separation membrane element and a second separation membrane element,
the separation membrane pair included in the first separation membrane element comprises a raw water feed portion and a concentrate discharge portion respectively in opposite end portions in a longitudinal direction of the perforated-water collection tube,
the separation membrane pair included in the second separation membrane element comprises a raw water feed portion or a concentrate discharge portion in an end portion in a direction perpendicular to the longitudinal direction of the perforated-water collection tube,
at least one first separation membrane element serves as a stage preceding the second separation membrane element, and
the following relation is satisfied:

$N1<N2<N3$, wherein
N1 designates the number of the separation membrane elements E1 in the state S2 when a concentration of a substance X in the raw water supplied to the separation membrane element unit is not smaller than a threshold A,
N2 designates the number of the separation membrane elements in the state S2 when the concentration of the substance X in the raw water is smaller than the threshold A, and
N3 designates the total number of the separation membrane elements.

* * * * *